(12) United States Patent
Lin et al.

(10) Patent No.: US 6,707,264 B2
(45) Date of Patent: Mar. 16, 2004

(54) SEQUENTIAL BURST MODE ACTIVATION CIRCUIT

(75) Inventors: Yung-Lin Lin, Palo Alto, CA (US); Yu-Cheng Chang, Foster City, CA (US); Bingwei Yao, Chofu (JP)

(73) Assignee: 2Micro International Limited, Georgetown (KY)

( * ) Notice: Subject to any disclaimer, the term of this patent is extended or adjusted under 35 U.S.C. 154(b) by 0 days.

(21) Appl. No.: 10/299,206

(22) Filed: Nov. 19, 2002

(65) Prior Publication Data

US 2003/0071586 A1 Apr. 17, 2003

Related U.S. Application Data

(63) Continuation of application No. 09/757,265, filed on Jan. 9, 2001, now Pat. No. 6,501,234.

(51) Int. Cl.[7] .................. H05B 37/02; H05B 39/04; H02M 3/335
(52) U.S. Cl. .................. 315/307; 315/98; 11/209 R
(58) Field of Search .................. 315/307, 247, 315/225, 160, 127, 119, 175, 128, 219, 224, 209 R, 308, 291

(56) References Cited

U.S. PATENT DOCUMENTS

| | | | |
|---|---|---|---|
| 4,464,606 A | 8/1984 | Kane .................. 315/158 |
| 4,535,399 A | 8/1985 | Szepesi .................. 363/41 |
| 4,541,041 A | 9/1985 | Park et al. .................. 363/41 |
| 4,672,528 A | 6/1987 | Park et al. .................. 363/98 |
| 4,727,469 A | 2/1988 | Kammiller .................. 363/56 |
| 4,794,506 A | 12/1988 | Hino et al. .................. 363/25 |
| 4,814,962 A | 3/1989 | Magalhaes et al. .................. 363/16 |
| 4,833,584 A | 5/1989 | Divan .................. 363/37 |
| 4,855,888 A | 8/1989 | Henze et al. .................. 363/17 |
| 4,860,189 A | 8/1989 | Hitchcock .................. 363/132 |
| 4,864,483 A | 9/1989 | Divan .................. 363/37 |
| 4,912,622 A | 3/1990 | Steigerwald et al. .................. 363/98 |
| 4,935,857 A | 6/1990 | Nguyen et al. .................. 363/17 |
| 4,952,849 A | 8/1990 | Fellows et al. .................. 315/307 |

(List continued on next page.)

OTHER PUBLICATIONS

"An Introduction to the Principles and Features of Resonant Power Conversion", Steve Freeland, from *Recent Developments in Resonant Power Conversions*, Intertec Communications, Inc., 1998, pp. 20–43.

"Zero–Voltage Switching Technique in DC/DC Converters", Kwang–Hwa Lie and Fred C. Lee, from *Recent Developments in Resonant Power Conversion*, Intertec Communications, Inc., 1988, pp. 211–223.

(List continued on next page.)

*Primary Examiner*—James Clinger
*Assistant Examiner*—Chuc Tran
(74) *Attorney, Agent, or Firm*—Grossman Tucker Perreault & Pfleger, PLLC

(57) ABSTRACT

A sequential burst mode regulation system to deliver power to a plurality of loads. In the exemplary embodiments, the system of the present invention generates a plurality of phased pulse width modulated signals from a single pulse width modulated signal, where each of the phased signals regulates power to a respective load. Exemplary circuitry includes a PWM signal generator, and a phase delay array that receives a PWM signal and generates a plurality of phased PWM signals which are used to regulate power to respective loads. A frequency selector circuit can be provided that sets the frequency of the PWM signal using a fixed or variable frequency reference signal.

22 Claims, 16 Drawing Sheets

U.S. PATENT DOCUMENTS

| | | | |
|---|---|---|---|
| 4,953,068 A | 8/1990 | Henze | 363/17 |
| 4,992,919 A | 2/1991 | Lee et al. | 363/17 |
| 5,017,800 A | 5/1991 | Divan | 307/66 |
| 5,027,263 A | 6/1991 | Harada et al. | 363/16 |
| 5,027,264 A | 6/1991 | DeDoncker et al. | 363/16 |
| 5,105,127 A | 4/1992 | Lavaud et al. | 315/291 |
| 5,113,334 A | 5/1992 | Tuson et al. | 363/25 |
| 5,132,888 A | 7/1992 | Lo et al. | 363/17 |
| 5,132,889 A | 7/1992 | Hitchcock et al. | 363/17 |
| 5,157,592 A | 10/1992 | Walters | 363/17 |
| 5,198,969 A | 3/1993 | Redl et al. | 363/17 |
| 5,208,740 A | 5/1993 | Ehsani | 363/124 |
| 5,231,563 A | 7/1993 | Jitaru | 363/98 |
| 5,235,501 A | 8/1993 | Stuart et al. | 363/17 |
| 5,268,830 A | 12/1993 | Loftus, Jr. | 363/17 |
| 5,285,372 A | 2/1994 | Huynh et al. | 363/132 |
| 5,291,382 A | 3/1994 | Cohen | 363/16 |
| 5,305,191 A | 4/1994 | Loftus, Jr. | 363/17 |
| 5,363,020 A | 11/1994 | Chen et al. | 315/209 R |
| 5,384,516 A | 1/1995 | Kawabata et al. | 315/160 |
| 5,394,064 A | 2/1995 | Ranganath et al. | 315/209 |
| 5,402,329 A | 3/1995 | Wittenbreder, Jr. | 363/16 |
| 5,412,557 A | 5/1995 | Lauw | 363/37 |
| 5,418,703 A | 5/1995 | Hitchcock et al. | 363/17 |
| 5,420,779 A | 5/1995 | Payne | 363/56 |
| 5,422,546 A | 6/1995 | Nilssen | 315/219 |
| 5,430,632 A | 7/1995 | Meszlenyi | 363/17 |
| 5,430,641 A | 7/1995 | Kates | 363/133 |
| 5,448,155 A | 9/1995 | Jutras | 323/285 |
| 5,448,467 A | 9/1995 | Ferreira | 363/17 |
| 5,481,160 A | 1/1996 | Nilssen | 315/209 R |
| 5,510,974 A | 4/1996 | Gu et al. | 363/134 |
| 5,514,921 A | 5/1996 | Steigerwald | 307/125 |
| 5,546,300 A | 8/1996 | Lee et al. | 363/132 |
| 5,559,395 A | 9/1996 | Venkitasubrahmanian et al. | 315/247 |
| 5,559,688 A | 9/1996 | Pringle | 363/89 |
| 5,583,402 A | 12/1996 | Moisin et al. | 315/307 |
| 5,615,093 A | 3/1997 | Nalbant | 363/25 |
| 5,619,402 A | 4/1997 | Liu | 363/20 |
| 5,638,260 A | 6/1997 | Bees | 363/17 |
| 5,646,836 A | 7/1997 | Sadarnac et al. | 363/98 |
| 5,669,238 A | 9/1997 | Devers | 62/657 |
| 5,684,683 A | 11/1997 | Divan et al. | 33/65 |
| 5,694,007 A * | 12/1997 | Chen | 315/247 |
| 5,712,533 A | 1/1998 | Corti | 315/169.3 |
| 5,715,155 A | 2/1998 | Shahani et al. | 363/132 |
| 5,719,474 A | 2/1998 | Vitello | 315/307 |
| 5,731,652 A | 3/1998 | Shimada | 310/316 |
| 5,736,842 A | 4/1998 | Jovanovic | 353/222 |
| 5,742,495 A | 4/1998 | Barone | 363/65 |
| 5,742,496 A | 4/1998 | Tsutsumi | 363/95 |
| 5,744,915 A | 4/1998 | Nilssen | 315/209 R |
| 5,748,457 A | 5/1998 | Poon et al. | 363/16 |
| 5,764,494 A | 6/1998 | Schutten et al. | 363/17 |
| 5,774,346 A | 6/1998 | Poon et al. | 363/17 |
| 5,781,418 A | 7/1998 | Chang et al. | 363/16 |
| 5,781,419 A | 7/1998 | Kutkut et al. | 363/17 |
| 5,784,266 A | 7/1998 | Chen | 363/16 |
| 5,796,598 A | 8/1998 | Nowak et al. | 363/37 |
| 5,818,172 A | 10/1998 | Lee | 315/86 |
| 5,834,889 A | 11/1998 | Ge | 313/493 |
| 5,844,378 A | 12/1998 | LoCascio et al. | 315/307 |
| 5,844,540 A | 12/1998 | Terasaki | 345/102 |
| 5,854,617 A | 12/1998 | Lee et al. | 345/102 |
| 5,856,916 A | 1/1999 | Bonnet | 363/20 |
| 5,875,103 A | 2/1999 | Bhagwat et al. | 363/17 |
| 5,880,940 A | 3/1999 | Poon | 363/20 |
| 5,886,477 A | 3/1999 | Honbo et al. | 315/209 PZ |
| 5,886,884 A | 3/1999 | Baek et al. | 363/48 |
| 5,894,412 A | 4/1999 | Faulk | 363/56 |
| 5,900,700 A | 5/1999 | Arndt et al. | 315/291 |
| 5,910,709 A | 6/1999 | Stevanovic et al. | 315/225 |
| 5,917,722 A | 6/1999 | Singh | 363/132 |
| 5,923,129 A | 7/1999 | Henry | 315/307 |
| 5,930,121 A | 7/1999 | Henry | 363/16 |
| 5,932,976 A | 8/1999 | Maheshwari et al. | 315/291 |
| 5,939,830 A | 8/1999 | Praiswater | 315/DIG. 4 |
| 5,946,200 A | 8/1999 | Kim et al. | 363/17 |
| 6,011,360 A | 1/2000 | Gradzki et al. | 315/244 |
| 6,114,814 A * | 9/2000 | Shannon et al. | 315/219 |
| 6,259,615 B1 | 7/2001 | Lin | 363/98 |
| 6,316,881 B1 * | 11/2001 | Shannon et al. | 315/219 |
| 6,469,453 B2 | 10/2002 | Tajika et al. | 315/199 |

OTHER PUBLICATIONS

"A New and Improved Control Technique Greatly Simplifies the Design of ZVS Resonant Inverters and DC/DC Power Supplies", Mehmet K. Nalbant, 1995 IEEE, pp. 694–701.

*Switching Power Supply Design*, Abraham I. Pressman, McGraw–Hill, 1991, pp. 93–104; 471–492.

Phase Shifted, Zero Voltage Transition Design Considerations and the UC3875 PWM Controller, by Bill Andreyeak, Unitrode, Application Note, May 1997, pp. 1–14.

"Fixed–Frequency, Resonant–Switched Pulse Width Modulation with Phase–Shifted Control", by Bob Mammano and Jeff Putsch, *Power Supply Design Seminar*, Unitrode, 1991, pp. 5–1 to 5–7.

"Zero–Voltage Switching Resonant Power Conversion", by Bill Andreyeak, from *Power Supply Design Seminar*, Unitrode, 1991, pp. A2–1 to A2–24; and A2–1A to A2–3A.

"Resonant Mode Converter Topologies", by Bob Mammano, from *Power Supply Design Seminar*, Unitrode, 1991, pp. P3–1 to P3–12.

"The New UC3879 Phase–Shifted PWM Controller Simplifies the Design of Zero Voltage Transition Full–Bridge Converters", by Laszlo Balogh, Unitrode, Application Note, 1995, pp. 1–8.

"A Comparative Study of a Class of Full Bridge Zero–Voltage–Switched PWM Converters", by W. Chen et al., 1995 IEEE, pp. 893–899.

"Optimum ZVS Full–Bridge DC/DC Converter with PWM Phase–Shift Control; Analysis, Design Considerations, and Experimental Results", by Richard Red I et al., 1994 IEEE. pp. 159–165.

"A Frequency/PWM Controlled Converter with Two Independently Regulated Outputs", by R.A. Fisher et al., HFPC, May 1989, pp. 459–471.

"High Density Power–Hybrid Design of a Half–Bridge Multi–Resonant Converter", by Richard Farrington, et al., HFPC–Virginia Polytechnic Institute, May 1990, pp. 26–33.

"Small–Signal Analysis of the Zero–Voltage Switched Full–Bridge PWM Converter", V. Vlatkovic et al., HFPC–Virginia Polytechnic Institute, May 1990, pp. 262–272.

"Feasible Characteristic Evaluations of Resonant Tank PWM Inverter–Linked DD–DC HIgh–Power Converters for Medical–Use High–Voltage Application", by H. Takano et al., 1995 IEEE, pp. 913–919.

* cited by examiner

FIG. 5(a)

| Sel0 (SELECT 0) | 0 | 0 | 1 | 1 |
|---|---|---|---|---|
| Sel1 (SELECT 1) | 0 | 1 | 0 | 1 |
| n (# OF CCFLs) | 6 (OR MIN #) | 8 (MIN # +2) | 10 (MIN # +2²) | 12 (MIN # +2+2²) |

FIG. 5(b)

| Sel0 | 0 | 1 | 0 | 1 | 0 | 1 | 0 | 1 |
|---|---|---|---|---|---|---|---|---|
| Sel1 | 0 | 0 | 1 | 1 | 0 | 0 | 1 | 1 |
| Sel2 | 0 | 0 | 0 | 0 | 1 | 1 | 1 | 1 |
| n (# OF LOADS) | MIN + 0 | MIN + 2 | MIN + 4 | MIN + 6 | MIN + 8 | MIN + 10 | MIN + 12 | MIN + 14 |

SEQUENTIAL BURST MODE ACTIVATION CIRCUIT

This is a continuation of, and claims priority to, application Ser. No. 09/757,265, filed Jan. 9, 2000 now U.S. Pat. No 6,501,234, which is hereby incorporated by reference.

BACKGROUND OF THE INVENTION

1. Field of the Invention

The present invention relates to a sequential burst mode activation circuit. More particularly, the present invention provides a circuit topology for improving the consistency of performance in the activation and intensity variation of multiple loads. The present invention has general utility wherever multiple loads are employed for intensity variation. Further, the present invention has specific utility where multiple fluorescent lamps, especially multiple cold cathode fluorescent lamps (CCFLs), are employed, for example, in television and computer screens, and in backlights for LCDs (Liquid Crystal Displays).

2. Description of Related Art

Various lighting and dimming circuits and techniques for lighting or dimming lamps or varying intensities of loads are known. One method of dimming a fluorescent lamp, especially as used in a backlight of a liquid crystal display (LCD), is known as a voltage controlled dimming system. The voltage controlled dimming system includes current control and current feedback control. According to the voltage control dimming system, dimming is performed by varying an input voltage to an inverter so as to adjust an output voltage from the inverter (i.e., an application voltage to the fluorescent tube). As the fluorescent tube emits light using discharging energy, when the application voltage to the fluorescent tube is too low, the discharging becomes unstable. For this reason, a large dimming range cannot be achieved by the voltage control dimming system, and the possible dimming ratio is only around 2:1, the dimming ratio being indicative of the dimming range of the lamp system.

Another technique for dimming a fluorescent lamp is the "burst mode" dimming system in which an alternating signal that is supplying power to the lamp is cut with a notch of variable width so as to reduce the power applied to the lamp and thereby provide the desired dimming. The smaller the widths of AC power provided to the lamp, the lower the luminance at which the lamp operates. A common device for providing the ability to vary the width of the pulses are commercially-available pulse-width modulators ("PWM").

In burst mode dimming, dimming is performed by periodically flashing the light source with a varying time ratio between the light-on duration and light-out duration. Therefore, this system, as opposed to the aforementioned voltage controlled dimming method, offers a large dimming ratio, potentially greater than 100:1, thereby allowing for large variations in luminosity.

U.S. Pat. No. 5,844,540 provides lighting/dimming circuitry for the back light control function in an LCD (Liquid Crystal Display). A "PWM dimmer driving circuit" modulates the magnitude of current to be supplied through an inverter to a fluorescent tube on the back surface of a liquid crystal panel. One goal of this circuitry is to prevent inconsistency of lighting, or occurrence of flicker, between the back light, or fluorescent tube, and the LCD; the other goal is to reduce sound noise. The PWM and inverter circuitry modulates the light source driving means so as to have the ability to periodically flash the light source with varying time ratios between the light on and light off durations, thereby creating different average intensities of light. The light-on duration is determined by a 'pulse count circuit' which provides an input for the PWM circuitry; this pulse count circuit counts the number of pulses of the LCD panel horizontal synchronizing signal, and provides for an on-duration that allows for the back light to synchronize it's lighting signal with that of the LCD. Further, the lighting/on-off frequency of the light source is a division of the horizontal driving frequency of the LCD panel's horizontal synchronizing signal, thereby allowing both LCD panel's display and the back light to be in phase with each other. This topology provides a "burst-mode" dimming system but only for a single fluorescent lamp. It further advocates synchronization of backlight lighting with that of the LCD in order to prevent inconsistency of lighting between the LCD and backlight. Note that fluorescent lamps, especially cold cathode fluorescent lamps, are high in impedance when initially powered up. If multiple CCFLs (cold cathode fluorescent lamps) were utilized, synchronization of all lamps with one light source would result in current ripples; these current ripples retard inverter performance and cause flicker. This is because, where multiple CCFLs are synchronized, a power supply needs to provide enough power to turn on all CCFLs concurrently. The instant power delivered from the power supply causes the supply voltage to drop due to its limited dynamic response. Therefore, the use of PWM signals, i.e. "burst-mode" dimming, is not, by itself, effective in providing a solution to flicker/noise in multiple lamp configurations.

One technique used to compensate for flicker or noise in the burst-mode dimming of multiple CCFLs is to place a capacitor in series with the power supply to absorb power surges that cause the current ripples. A drawback of this technique is that, when the lamps turn off in each burst mode cycle, the power supply line, which has an intrinsic inductance, continues to carry current which charges the capacitor, yielding an increase in output voltage.

Prior art teachings with the activation with multiple loads, where the loads are not fluorescent lamps, do not address the flicker or noise problem presented by the activation of multiple lamps.

SUMMARY OF THE INVENTION

Accordingly, the present invention solves the drawbacks of the prior art by providing a sequential burst mode activation circuit for multiple loads by generating a phase shift between multiple burst-mode signals. The burst mode signals are used to regulate power delivered to loads, where each load is regulated by a separate phase-shifted burst signal such that at least two loads do not turn on synchronously. The circuit of the present invention overcomes prior art regulation circuits by eliminating instantaneous high current ripples and noise created by multiple loads turning on simultaneously.

The present invention provides a sequential burst mode activation circuit comprising a variable power regulator, comprising a pulse modulator generating a pulse signal having a pulse width; a frequency selector generating a frequency selection signal; and a phase delay array receiving said pulse signal and said frequency selection signal, and generating a plurality of phased burst signals, wherein at least two of said phased burst signals have different start times In method form, the present invention provides a method for generating phase shifted burst mode signals, comprising the steps of generating a pulse signal having a pulse width, generating a frequency selection signal, generating a plurality of phased burst signals having a frequency of said frequency selection signal and pulse width of said pulse signal, and delaying at least one of the phased burst signals to have a different start time than at least one other of the phased burst signals.

The present invention also provides a phased burst mode dimming system, comprising: a pulse width modulator generating a pulse width modulated signal; a variable selector for selecting the width of said pulse width modulated signal; and a phase delay array receiving said pulse modulated signal and said frequency selection signal, and generating a plurality of phased burst signals by generating a phase delay between at least two said pulse width modulated signals.

In one exemplary embodiment, power is regulated to a plurality of loads using the plurality of phased burst signals. Additionally, a constant or variable phase delays is generated between each phased burst mode signal. In an exemplary system, the present invention provides a sequential burst mode dimming circuit for multiple lamps. In particular, the exemplary system provides a sequential burst mode dimming circuit for a plurality of cold cathode fluorescent lamps (CCFLs). Customer or software inputs vary the pulse width of a PWM signal, thereby determining the power to be delivered to the lamps. A reference signal is doubled to select the frequency of the PWM signal. This selected frequency determines the frequency at which lamps turn on and off. Using a counter and a clock, multiple phased burst signals are generated from the above burst signal for the plurality of CCFL's. Each phased burst signal is shifted by a constant phase shift such that at least two lamps receive burst signals that are out of phase. Therefore, sequential burst-mode activation of each lamp is generated. Finally, in the exemplary system, a plurality of phase array drivers, each of which uses feedback from a corresponding lamp in combination with a corresponding phased burst signal, delivers power to and regulates the intensities of a corresponding plurality of lamps.

Another exemplary system of the present invention includes a frequency selector that generates a frequency selection signal for a backlight load which follows, as reference, a conventional screen updating frequency of a cathode ray tube (CRT) in a television set. In yet another exemplary system, a phase delay array generates a plurality of phased burst signals, such that no two phased burst signals have different start times. In an example of such an embodiment, a phase delay array generates a constant or variable phase delay so that each of the phased burst signals is delayed by such a phase delay from another of the phased burst signals.

It will be appreciated by those skilled in the art that although the following Detailed Description will proceed with reference being made to exemplary systems and methods of use, the present invention is not intended to be limited to these exemplary systems and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIGS. 5(a) and 5(b) are charts of 'select' signal inputs to circuitry reflecting the resulting number of loads;

DETAILED DESCRIPTION OF THE EXEMPLARY EMBODIMENTS

The following description will reference a burst mode regulating circuit for a plurality of cold cathode fluorescent lamps (CCFLs). CCFLs are arranged, for example, in large panels for displays. Typically, large CCFL panels each utilize a minimum of 6 lamps, and the present invention will describe a burst mode activation circuit with 6 or more CCFls. Of course, the present invention is not to be limited by a minimum number of loads, nor is it to be limited to CCFLs or any particular type of loads.

Figure 1:
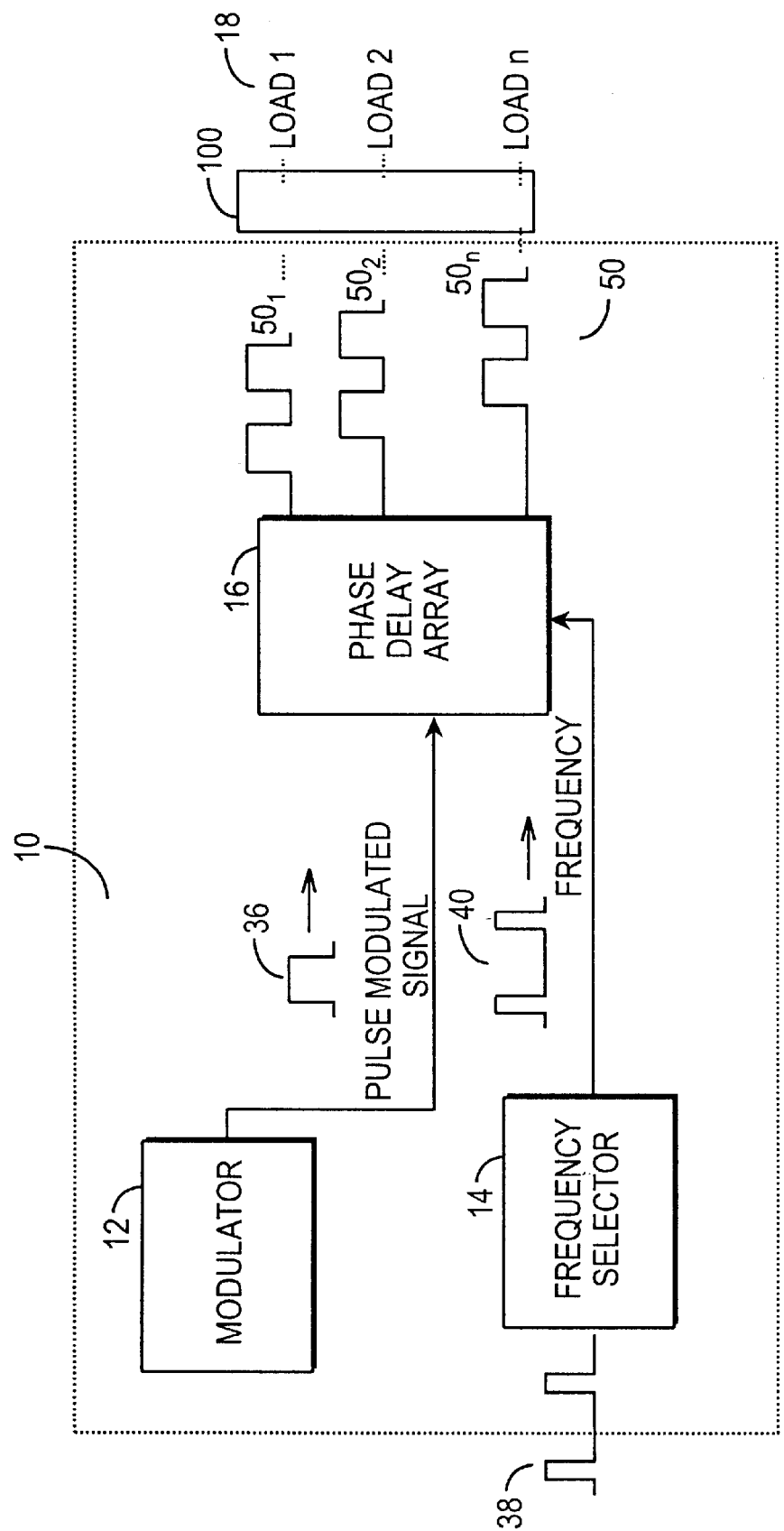
FIG. 1 is a top-level block diagram of an exemplary sequential burst mode signal generation system of the present invention.

FIG. 1 is a top-level block diagram of an exemplary sequential burst mode signal generation system 10 of the present invention. As a general overview, the sequential burst mode signal generation system 10 operates to generate phase-shifted burst mode signals 50 and sends these burst mode signals to drivers 100 to provide time-delayed regulation of power to a plurality of loads 18. "Burst mode", as used herein and as is understood in the art, generally means regulation of power to a load using a PWM signal to modulate the power delivered to the load based on the pulse width of the PWM signal. System 10 generally includes modulator 12 generating a pulse modulated signal 36, frequency selector 14 generating a frequency selection signal 40 for setting the frequency of the pulse modulated signal, and phase delay array 16 generating multiple phase-shifted burst signals 50. Advantageously, by independently regulating a plurality of loads 18 with a plurality of phase-shifted burst signals 50, thereby substituting the need for a single high power input with the adequacy of multiple low power inputs, the system 10 of the present invention resolves the aforementioned problems with conventional multiple load power regulation circuit.

Figure 2:
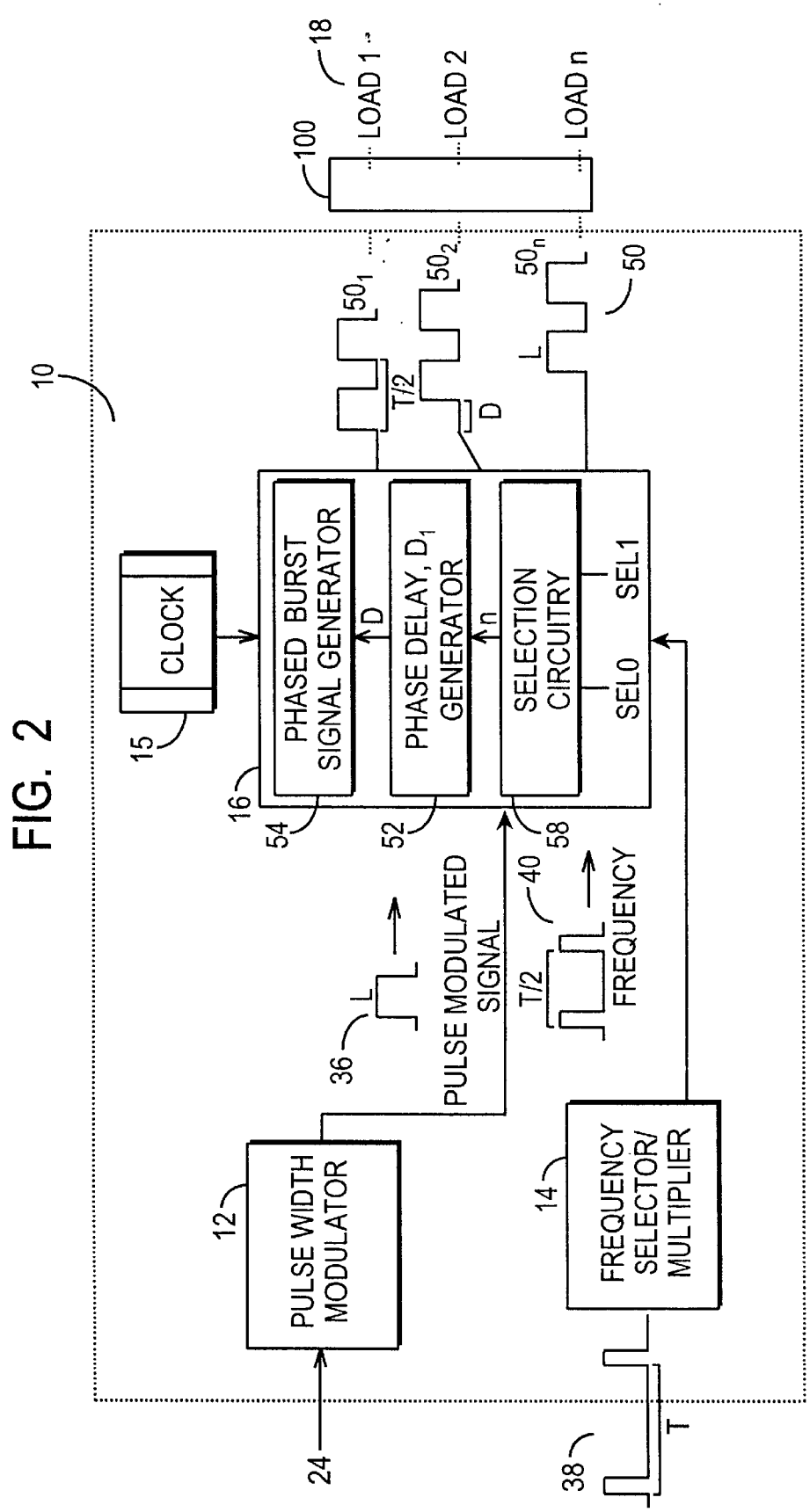
FIG. 2 is a more detailed block diagram of the exemplary sequential burst mode signal generation system of the present invention.

FIG. 2 is a more detailed block diagram of the system 10 of the present invention. Pulse modulator 12 generates a PWM (pulse width modulated) signal 36 having a pulse width L, whose duty cycle (i.e. pulse width) determines power delivered to a load 18. The frequency selector 14 selects the frequency of the PWM signal 36, based on an independent reference signal 38 of period, T. In an exemplary embodiment, for reasons that will become apparent below, frequency selector 14 comprises a multiplier to multiply the frequency of the reference signal 38 (of period, T) by a factor of k, and generate a multiple signal 40 (of period, T/k), where the multiple signal 40 is used to set the frequency of the PWM signal 36. For example, where the system 10 is utilized to regulate multiple CCFLs, a synchronizing signal, or Vsync, may be used as the reference signal 38. In an example where CCFLs are utilized in television, video, or LCD screens, Vsync 38 is an available video signal used to update the on-screen display. The use of Vsync may be desirable since if an arbitrary reference signal is selected independently of screen updating frequency then a "beat" may occur. A "beat" is understood by one skilled in the art to manifest itself in the following manner. A video display is transmitted across a television monitor by a cathode ray tube (CRT). The CRT, upon completing transmission of a display, returns to a starting position and proceeds to transmit the next display. The displays are refreshed at a frequency defined by Vsync. In the duration between the completion of one display transmission and the initiation of the next, no information is broadcast and the television screen is kept dark. If light is introduced in this duration, the transition of the CRT to its starting position may reveal visual lines superposing different displays. This is known in the art as 'beat.' If the frequency of burst mode regulation of lamps were not to follow Vsync frequency, light would be introduced during the aforementioned duration, thereby allowing for beats. Further, the screen updating frequency is multiplied because if a CCFL frequency is equal to and not a multiple of the screen updating frequency, the concurrent intensities of light may result in flicker. Thus, Vsync is a desired reference signal for the above exemplary applications.

In the exemplary embodiment where the reference signal 38 is multiplied to generate the multiple signal 40, it should be noted that when period T/k (k is the multiplier of signal 38) of the multiple signal 40 is greater than L of signal 36, that is, when period T of signal 38 is greater than k*L, each burst signal 50 will comprise distinct pulses. If the period T is equal to or less than k*L, then each burst signal 50 would be a high DC signal (i.e., each burst signal 50 would represent a full power setting). This is discussed further below. In the example in FIG. 2, frequency selector 14 doubles the frequency (i.e., k=2) of independent reference signal Vsync 38, thereby generating a frequency selection signal 40 having period of T/2. Both signal 36 and 40 are input into phase delay array 16 to generate a plurality of phased burst signals 50, as described below.

Phase delay array 16 includes phase delay generator 52 to determine a phase delay value, D, between successive phased burst signals, $50_1, 50_2, \ldots 50_n$; load selection circuitry to determine the number of loads n; and circuitry 54 to generate multiple phase-delayed pulse width modulated signals $50_n$. Each of these components is described in detail below.

Referring briefly to FIGS. 5(*a*) and 5(*b*), depicted are charts of 'select' signal inputs to selection circuitry 58. These inputs are used to quantify the number n of loads 18 coupled to circuit 10 of the present invention. Note that n also quantifies the number of phased burst signals 50. In an exemplary embodiment, selection circuitry 58 operates as a state machine to generate an appropriate signal to the phase delay generator 52 based on the binary value of input "select" signals. FIG. 5(*a*) illustrates "select" signal generation of an exemplary embodiment, where a minimum of 6 CCFLs are utilized. This table includes two inputs: Sel0 and Sel1, each generating a binary value indicative of the number of CCFLs. In this table, 6 CCFLs are represented by Sel0=0 and Sel1=0. Further CCFLs (added by increments of two) are defined in this table. The table of FIG. 5 (*b*) generalizes the above example of FIG. 5(*a*) to include less than a minimum of 6 and more than a maximum of 12 CCFLs. Generally, more select signal inputs 58 allow for a greater number of loads 18 to be utilized, i.e. a larger n. In this example, an additional select input is provided: Sel2, permitting additional loads to be defined. For reasons that will become apparent below, in the example using CCFLs as loads, it is desirable to define an even number of lamps in the circuit. Of course, those skilled in the art will recognize that the tables of FIGS. 5(*a*) and 5(*b*) and the selection circuitry 58 could be adapted to define any number of loads.

Figure 3:
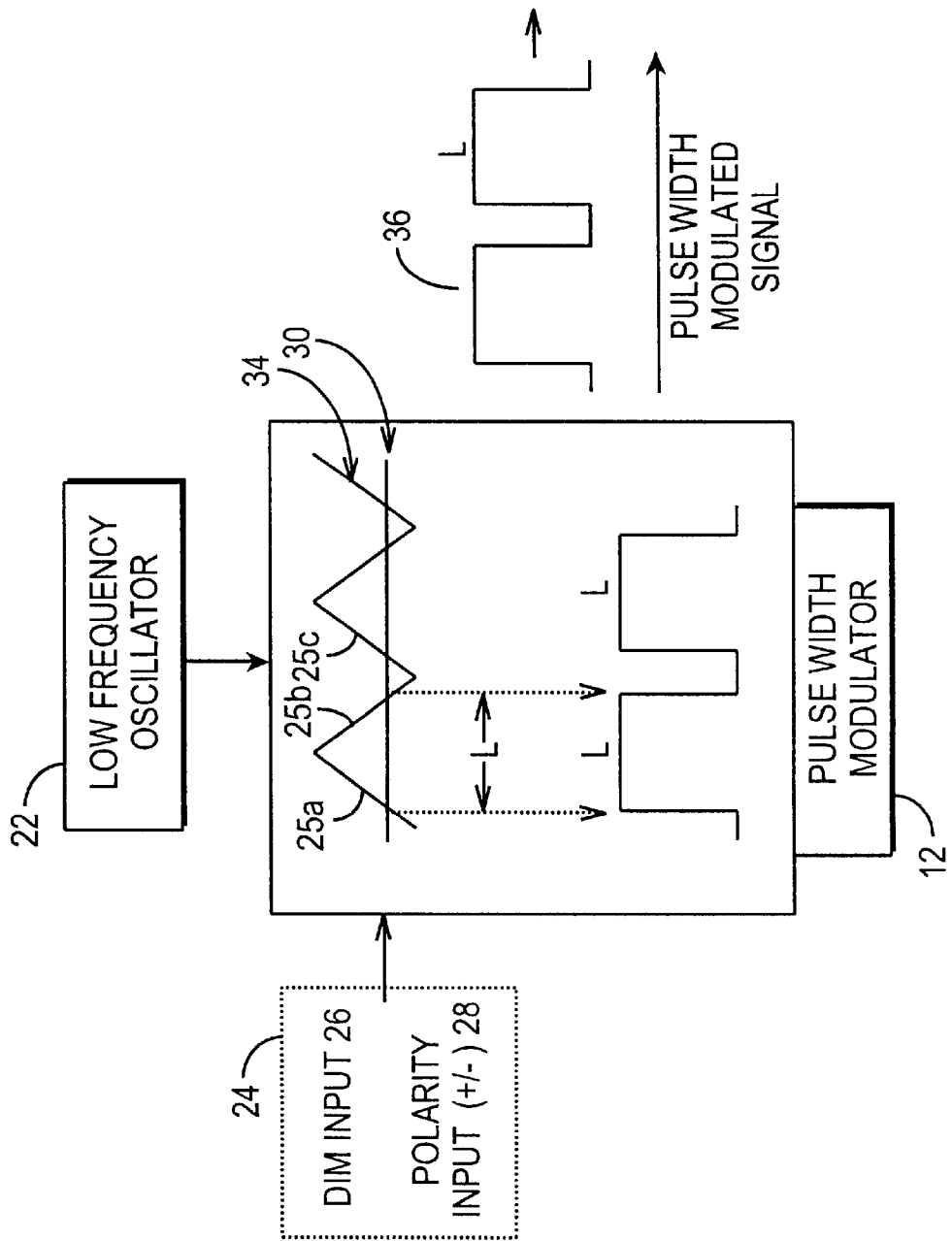
FIG. 3 is a signal representation of the pulse width modulator of the exemplary sequential burst mode signal generation system of the present invention.

FIG. 3 provides a signal representation of the pulse width modulator 12. Pulse width modulator 12 generates a pulse width modulated signal 36 whose pulse width, L, is set by variable selector 24. Variable selector 24 is provided to permit variable power (i.e. dimming) to be delivered to the load by changing the pulse width, L, of the PWM signal. Variable selector 24 varies the value of a DC signal 30 proportional to a desired dim setting. In an exemplary embodiment, the variable selector 24 comprises a dim selector 26 and a polarity selector 28. The dim selector 26 determines the desired dim setting by increasing or decreasing a DC signal 30. The polarity selector 28 is discussed further below. Oscillator 22 generates a triangular waveform 34 of predetermined frequency as an input to the pulse width modulator 12. The DC signal 30 is superimposed upon the triangular waveform 34. In one exemplary embodiment, illustrated in FIG. 3, a section, defined by the intersections of the DC voltage 30 with each of the rise, 25*a*, and fall, 25*b*, of each triangular wave 34, determines the leading and falling edges of each pulse, and thereby the pulse width, L, of a pulse width modulated signal 36. In this embodiment, a higher value of DC signal 30 generates a smaller pulse width, L and a lower value of DC signal 30 generates a larger pulse width, L. In an alternative embodiment, a section defined by each falling edge, 25*b*, and the next rising edge, 25*c*, is used to generate the pulse width, L. In this alternative embodiment, a higher value of DC signal 30 generates a larger pulse width, L, and a lower value of DC signal 30 generates a smaller pulse width, L. The polarity selector 28 determines which section of the intersections of the DC signal 30 and triangular waveform 34 is used to generate the pulse width, L. Thereby, the pulse width modulator 12 generates a PWM signal 36 of pulse width, L, determined by the user selection 24.

Figure 4:
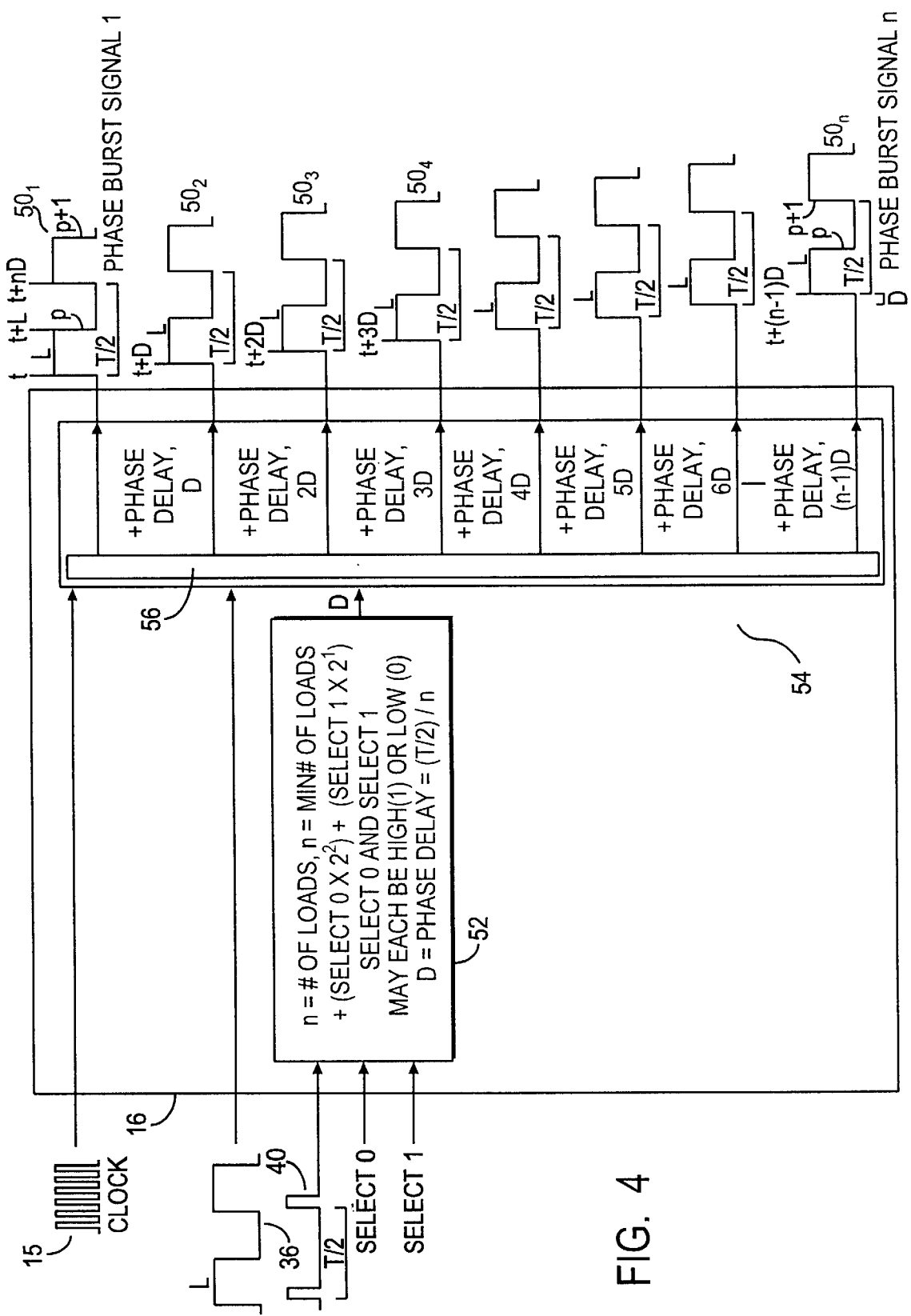
FIG. 4 is a signal representation of the phase delay array of the exemplary sequential burst mode signal generation system of the present invention.

FIG. 4 is a detailed block diagram and signal representation of phase delay array 16. Phase delay array 16 determines a phase delay value, D, and generates phased burst signals 50, as a function of L, T/2 and the number n. Phase delay array 16 receives as inputs a clock signal 15, PWM signal 36 having pulse width L, select signal inputs 58, and a reference signal 40 of doubled frequency, i.e., having a period of T/2. Preferably, the value of D is determined such that the phase shift between each phased burst signal 50 is constant, i.e. D is constant. Further, the phase delay D repeats itself between the last phased burst signal and the first, i.e., where there are n phased burst signals 50, each pulse, p, of phased burst signal n, $50_n$, is preferably leading by phase shift, D, from the next pulse, p+1, of phased burst signal 1, $50_1$. To accommodate this in the preferred embodiment, phase delay D equals (T/2)/n where T is the period of reference signal 38, T/2 is the period of signal 40, n is the number of phased burst signals 50, and the frequency of each phased signal 50 is equal to the frequency of signal 40. Those skilled in the art will recognize that, alternatively, the present invention may include variable phase delays such that the phase delay value is not constant but that some or all of the loads 18 still turn on at different times. Such alternative embodiments are included in the scope of the present invention.

In an exemplary embodiment, circuitry 54 includes a counter 56 with a clock input 15 to generate n phased burst signals 50 given the aforementioned inputs. Specifically, a counter 56 may be implemented with a series of toggling flip-flops wherein a clock pulse at a time of t triggers the first pulse of a first phased burst signal $50_1$, while a clock pulse at a time of t+D triggers the first pulse, p, of a second phased burst signal $50_2$. Likewise, the clock pulse at a time of t+2D triggers the first pulse of a third phased burst signal $50_3$ and a clock pulse at a time of t+(n−1)*D triggers the first pulse of an nth phased burst signal $50_n$. Thereupon, the clock pulse at t+(n)*D, triggers the second pulse of the first phased burst signal $50_1$. Since the period of each signal is T/2 where T is the period of the independent signal 38, it follows that [(t+nD)−t] equals T/2. In other words, n*D equals T/2, or D equals (T/2)/n.

Further, each phased burst signal 50 has pulse width, L. To accommodate this, the first pulse of an mth phased burst signal $50_m$, where 1 m n, is generated by sampling the clock signals starting at clock signal, t+(m−1)D, for a duration dictated by variable pulse width L. Subsequent phased burst signals 50 follow the same paradigm. Therefore, the first pulse of the first phased burst signal 50 may be generated from clock pulses, t, t+1, t+2, . . . , t+(L−1), such that L clock pulses account compose the pulse width L of each phased burst signal pulse, p. As noted earlier, to generate distinct pulses for each phased burst signal 50, L should be less than T/2. That is, if L is not less than T/2, each phased burst signal 50 will be a DC signal with no distinguishable pulses.

Figure 6:
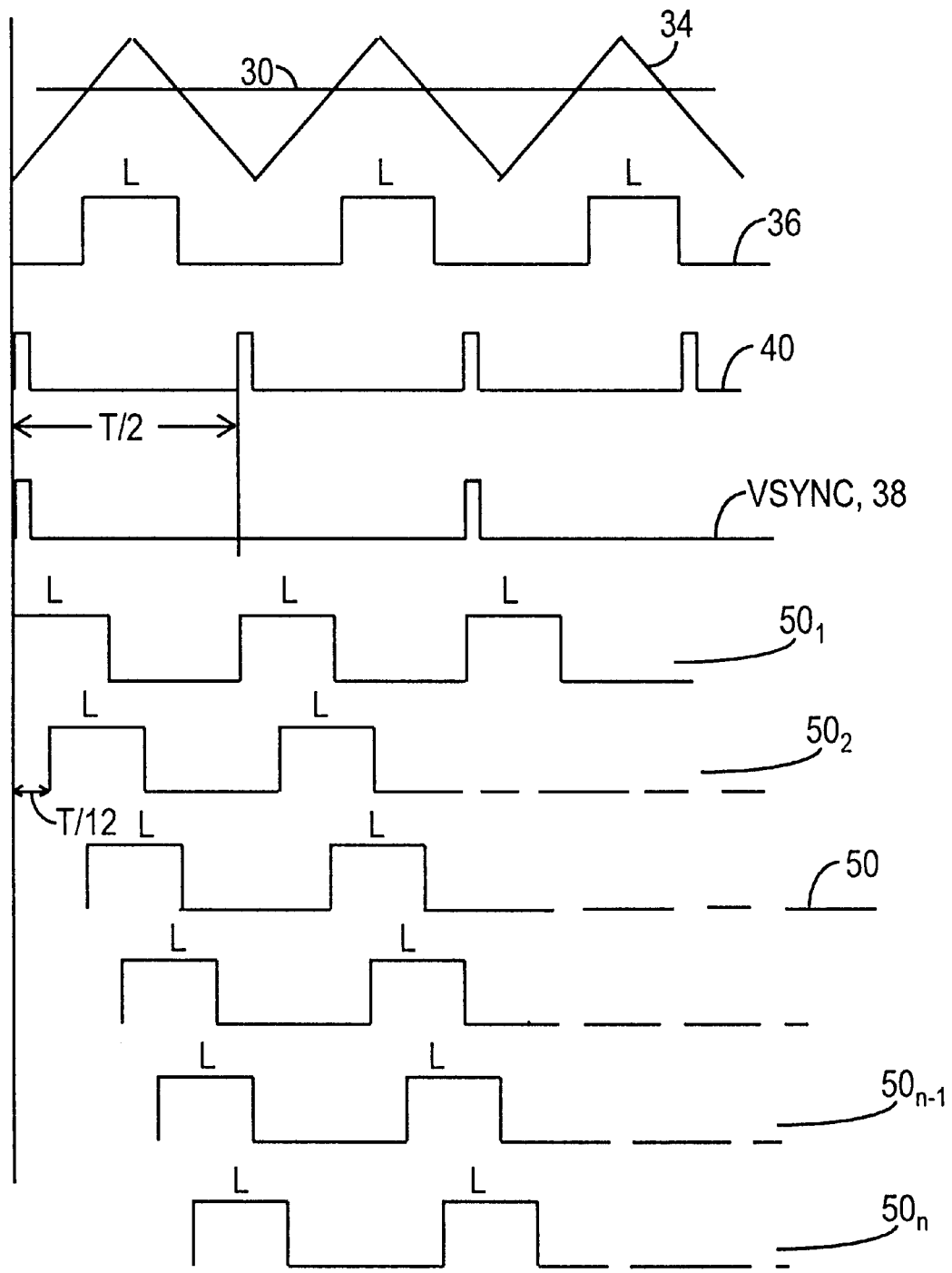
FIG. 6 provides a summary of the signals discussed in FIG. 1 through FIG. 5.

FIG. 6 summarizes signals discussed in FIGS. 1–5 above for an exemplary embodiment. Signal 34 is the triangular waveform generated by the oscillator 22 (FIG. 3). DC signal 30 is superimposed onto signal 34, and shifted up or down, i.e., increased or decreased, to produce a desired dimming. The intersections of signal 34 with DC signal 30 determine the rising and falling edge of each pulse of the pulse width modulated signal 36, thereby determining the pulse width, L, of each pulse of the pulse width modulated signal 36. Signal 36 follows the frequency of signal 34. The pulse width, L, of signal 36 is utilized to generate phased burst signals 50 (i.e., $50_1$ to $50_n$), while the frequency of signal 36 is not. The frequency of phased burst signals 50 is determined by an independent reference signal, Vsync 38, of period T. Vsync 38 is doubled to generate signal 40 of period T/2, i.e., frequency 2/T. The phased burst signals 50 are timed by this frequency, 2/T. The number of phased burst signals 50 is determined by an input as to the number of loads to be utilized. In the example, six (6) loads are utilized. Therefore, six (6) phased burst signals 50 are displayed, where each phased burst signal, for e.g., $50_2$, lags the previous phased burst signal, for e.g., $50_1$ by (T/2)/6=T/12.

Figure 7:
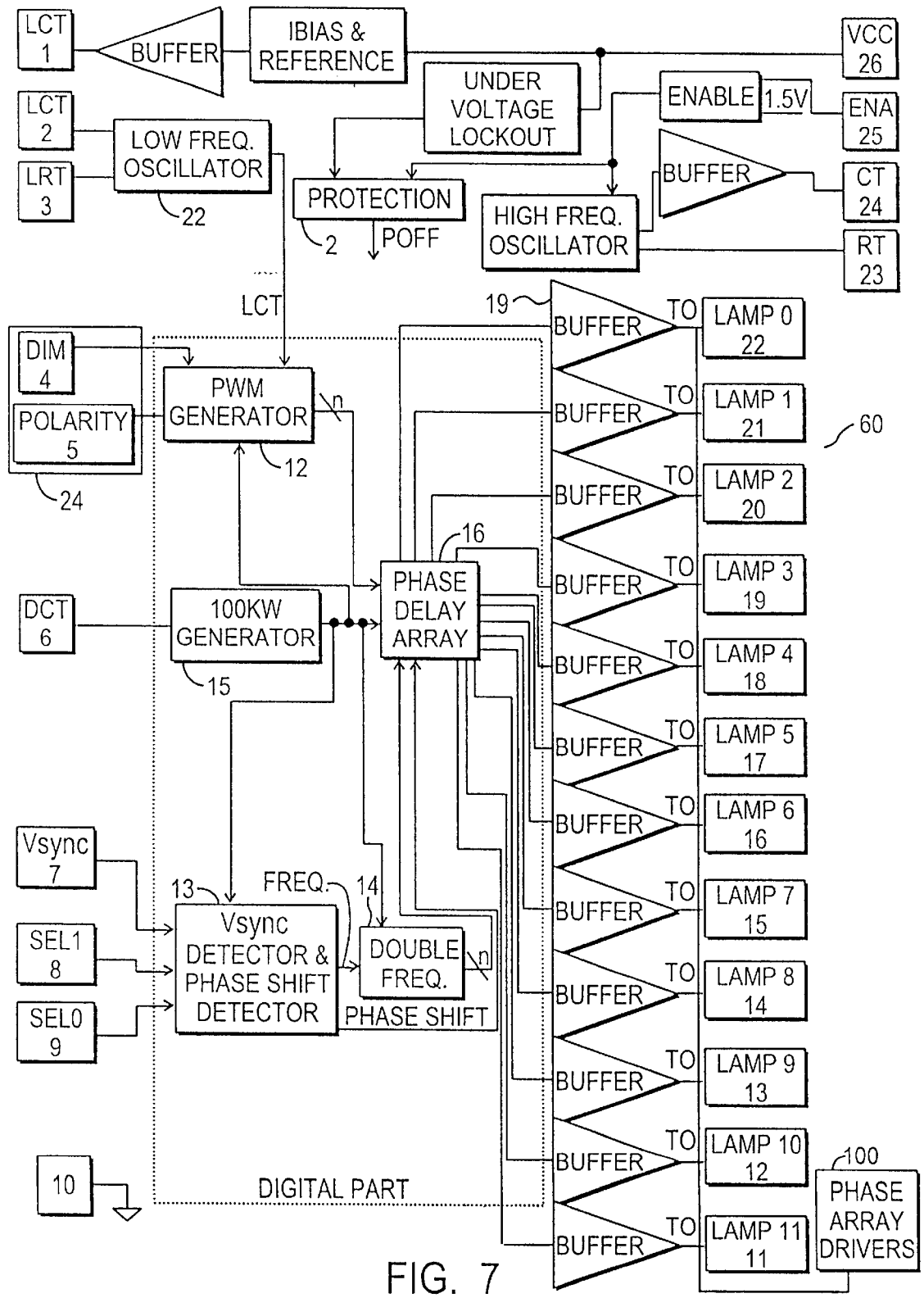
FIG. 7 is an exemplary IC implementation of the sequential burst mode generation system of the present invention.

FIG. 7 is an exemplary IC (integrated circuit) implementation 60 of the sequential burst mode signal generation system 10 of the present invention. The IC 60 comprises a PWM generator 12, Vsync detector & phase shift detector 13, frequency multiplier 14, and a phase delay array 16. Components 12, 14 and 16 are described above with reference to FIGS. 1–5. The exemplary IC 60 also includes a clock 15, an oscillator 22 to generate the triangular waveform 34, buffers 19 to amplify the current driving capacity of phased burst signals, and under voltage lockout protection circuitry 2.

The PWM generator 12 receives DIM, polarity, LCT, and a clock (100 KHz Generator) signal as inputs. The PWM generator 12 generates a PWM signal 36 as discussed above. Further, as described above, the pulse width of the PWM signal generated by generator 12 is selected using the DIM and polarity inputs. LCT of the exemplary IC 60 is the oscillator 22 input generating the aforementioned triangular waveform of predetermined frequency. The clock 15 is used to measure time increments such that the variable pulse width may be counted.

The Vsync detector & phase shift detector 13 receives as inputs, Vsync 38, Sel1, Sel0, and a clock 15. Vsync 38 is an independent reference signal as discussed above. The Vsync detector & phase shift detector 13 detects the presence of an independent reference signal, Vsync 38, and calculates a phase delay value, D, as described above. In the exemplary IC, if Vsync 38 is not detected, detector 13 utilizes the frequency of the oscillator 22 to generate a reference signal 38. When detector 13 detects a Vsync signal 38, the detector 13 abandons the oscillator frequency and adopts the Vsync frequency for signal 38. Detector 13 outputs the phase delay value, D, as well the independent reference signal, 38. Signal 38 along with a clock 15 is fed into a frequency doubler 14, wherein the frequency of Vsync is doubled to generate the burst frequency.

In the exemplary IC, the inputs of phase delay array 16 include PWM signal 36 from PWM generator 12, a burst frequency value from frequency doubler 14 and a clock 15. As described above, the phase delay array 16 utilizes a counter to generate multiple phase delayed burst signals, wherein each phased burst signal operates to regulate power to a load 18. Each phased burst signal is driven through a buffer 19 to amplify its current driving capacity, and then through a respective phase array driver 100. This is discussed further below.

The protection circuitry 2 is used to sense the voltage level of a power source (Vcc). When Vcc, shown at pin 26 in FIG. 6, increases from low to high, the protection circuit 2 resets the entire IC such that the IC is functionally at an initial status. When Vcc goes low, the protection circuit 2 shuts down the IC to prevent possible damage to the IC.

Figure 8:
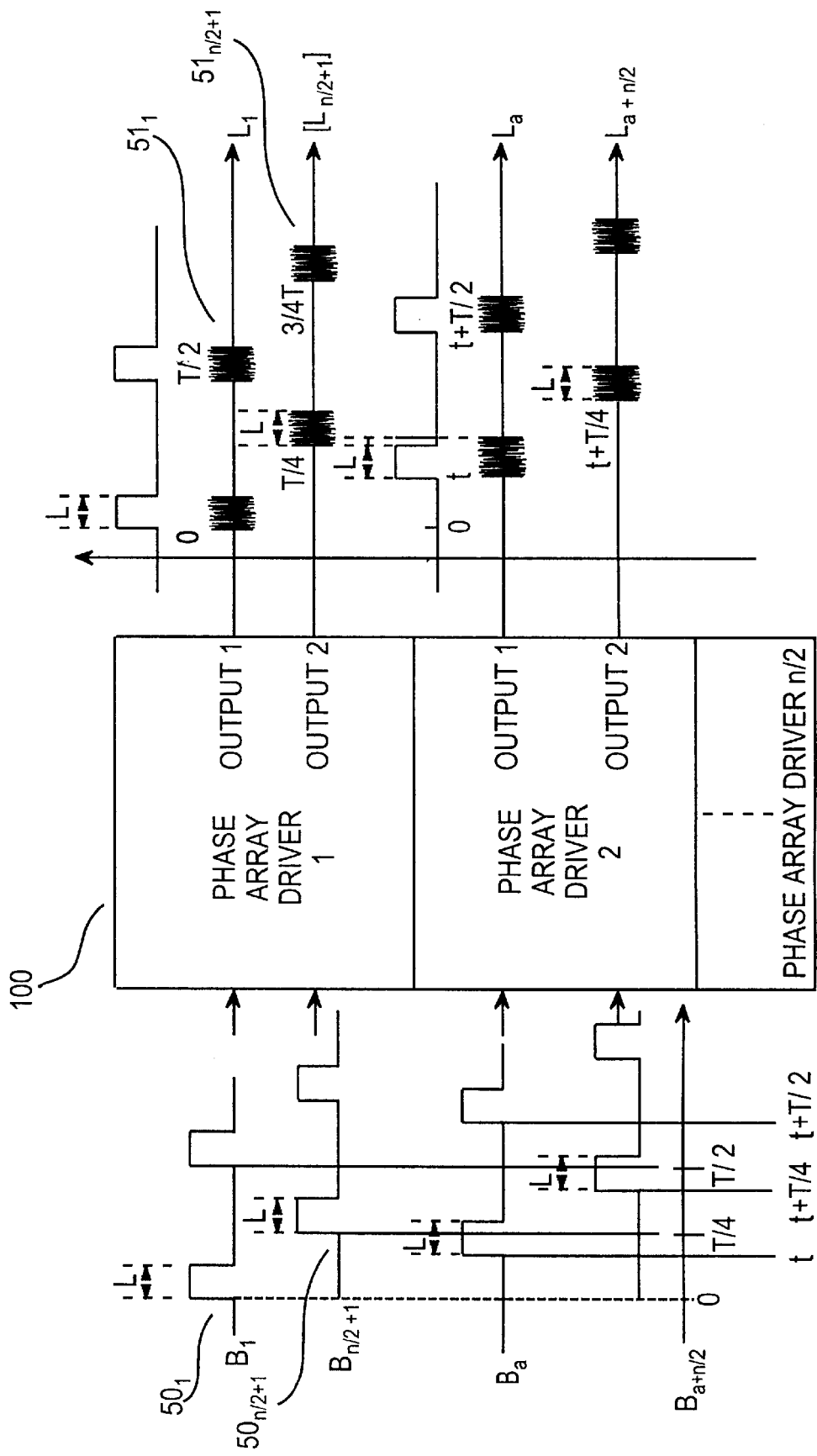
FIG. 8 is a top level diagram of phase array drivers of the present invention.

FIG. 8 shows a top-level diagram of exemplary phase array drivers 100. In an exemplary configuration, each phase array driver, Driver 1, Driver 2, . . . , Driver n/2, receives two phased burst signals as inputs, and outputs power to two respective loads. The regulation of power to each load is independent of the regulation of power to the other loads. Therefore, alternative configurations allow for each phase array driver 100 to regulate any number of loads totaling more or less than as depicted in the figures. In an exemplary system, each phase array driver 100 receives two phased burst signals 50 which are 180° out of phase and generates two power regulating signals 51 which are 180° out of phase. Phase array drivers 100 translate each variable pulse width L into a duration for which a respective load stays on in each cycle. Therefore, the greater the pulse width of a phased burst signal, the greater the power delivered to the respective load during each cycle. Also each load turns on and off at the burst frequency defined by the respective phased burst signal 50. Since driver 100 receives complementary signals in the exemplary system, the number of phased burst signals 50 is even for this embodiment.

Figure 9:
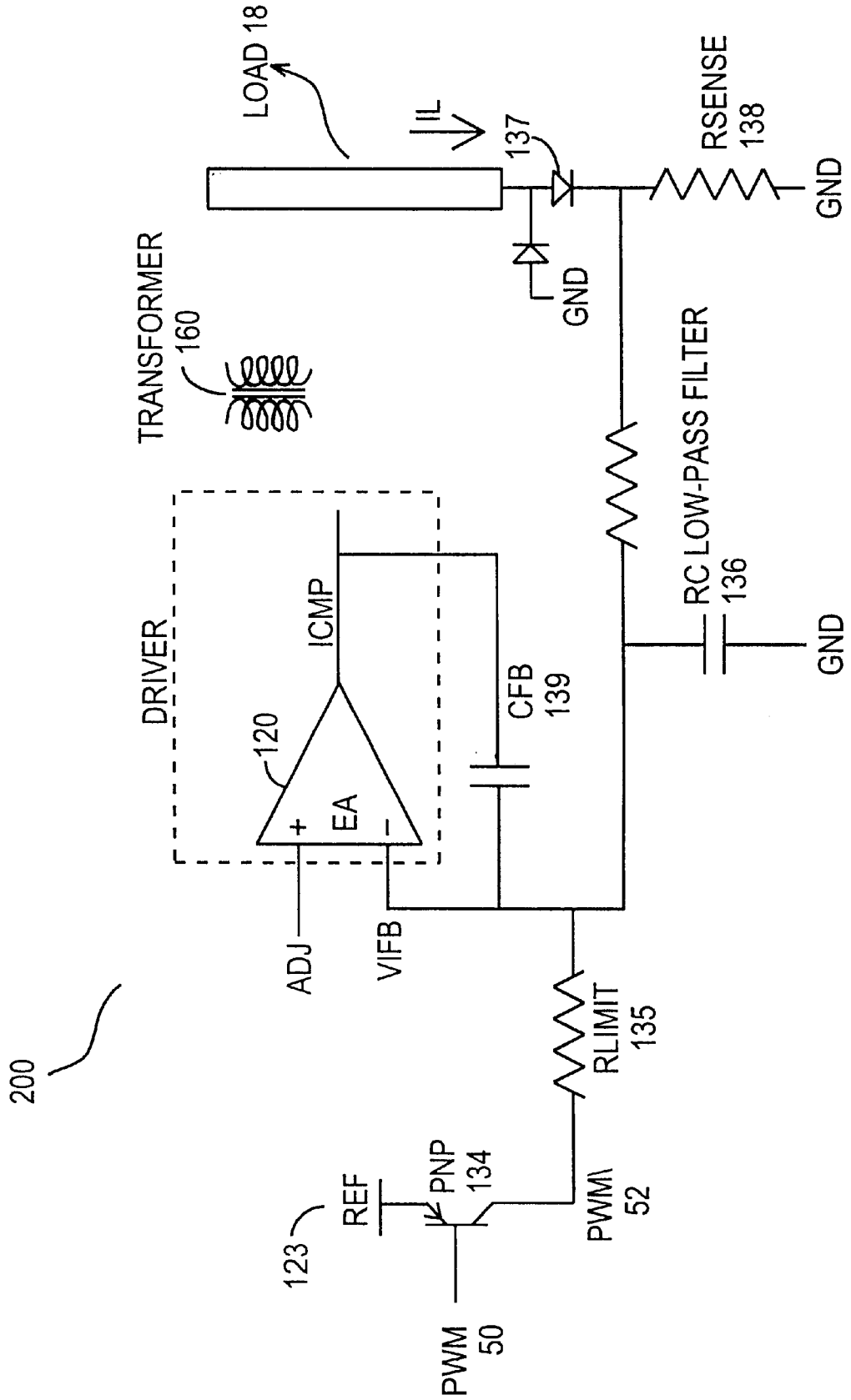
FIG. 9 is a circuit example showing how a phase array driver generates a power regulating signal in the present invention.
Figure 10:
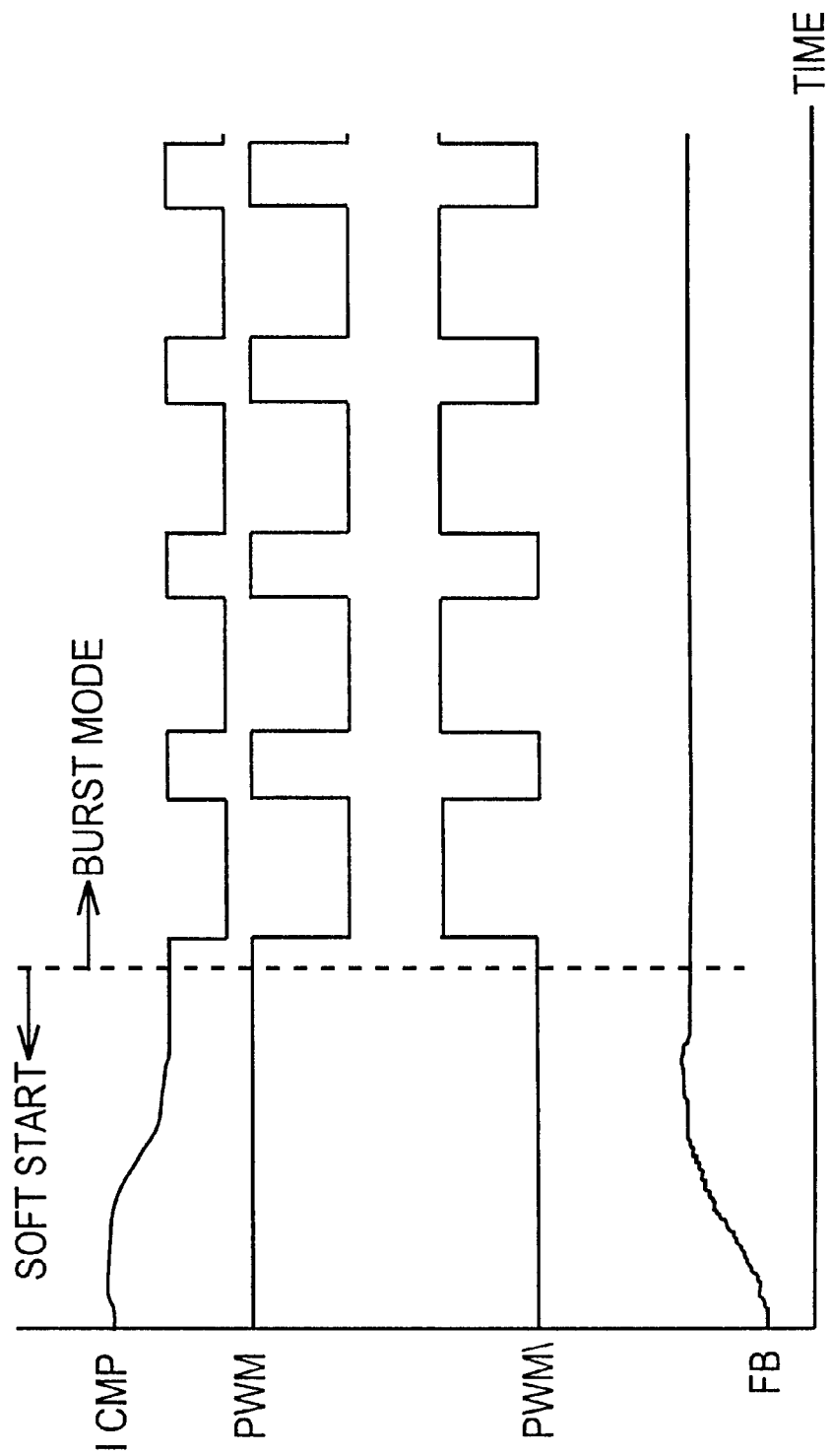
FIG. 10 is a timing diagram showing how a phase array driver generates a power regulating signal in the present invention.

FIG. 9 provides an exemplary circuit 200 demonstrating the generation of a load current controlling signal, ICMP, in a phase array driver 100. FIG. 10 is an accompanying timing diagram to FIG. 9. FIGS. 9 & 10 are considered together in the following discussion. Also, references are made to FIGS. 1–5.

Circuit 200 comprises an error amplifier 120 generating the current controlling signal, ICMP, a sense resistor Rsense 138 coupled in series to a load 18, a switch 134 for coupling circuit 200 to the phase delay array 16, and a feedback capacitor CFB 139. Additionally, an exemplary circuit 200 includes an RC low-pass filter 136 for filtering noise, and utilizes a transformer 160 to apply the current controlling signal, ICMP, to the load 18. The above components are discussed further below.

Generally circuit 200 receives a feedback signal, VIFB, and generates the current controlling signal, ICMP, during two modes of operation. The first mode is soft start and the second mode is burst mode. In soft start mode, the load 18 is powered up from an off state to an operationally on state during a warm up period, utilizing an external soft start controller (not shown). The soft start controller is discussed further below. In burst mode, the duty cycle of the aforementioned phased burst signal 50 (PWM) is utilized to regulate load current, IL, during the operationally on state of the load 18. That is, in an exemplary embodiment, IL will be proportional to [L/(T/K)]*ILmax, where L is the pulse width of signal 50, T/k is the period of signal 50, and ILmax is the load current when the load is fully powered on. In this manner, a load 18 is dimmed during burst mode. This is discussed further below. Note that soft start mode sequentially precedes burst mode. The current controlling signal, ICMP, regulates load current, IL, during burst mode, but not during soft start. During soft start, ICMP is monitored to determine when to toggle modes from soft start to burst mode. This is explained further below.

In both modes, the error amplifier 120 compares the feedback signal, VIFB, with a reference signal, ADJ, and generates the controlling signal, ICMP. In an exemplary embodiment, error amplifier 120 is a negative feedback operational amplifier. ADJ is a predetermined constant reference voltage representing the operational current of the load 18. This is discussed further below. ICMP varies to increase or decrease VIFB to equal ADJ. That is, if VIFB is less than ADJ, then the error amplifier 120 increases ICMP. Conversely, if VIFB is greater than ADJ, then the error amplifier 120 decreases ICMP. If VIFB=ADJ, ICMP is a constant to maintain VIFB at ADJ. The operations of exemplary circuit 200 during soft start mode and during burst mode are discussed in that order and in greater detail below.

As stated above, in soft start mode, the load 18 is powered up from an off state to an operationally on state. Circuit 200 generates the controlling signal, ICMP, based on the load current, IL, but not based on the respective phased burst signal, PWM 50. That is, during soft start, circuit 200 is decoupled from phase delay array 16 by switch 134. This is discussed further below. The following discussion proceeds with reference to ILrms and ILrms (spec). ILrms refers to the root mean square of the load current, IL at any given moment. ILrms (spec), as used herein, is the manufacturer's load specifications when the load 18 is operating at full power.

Figure 9A:
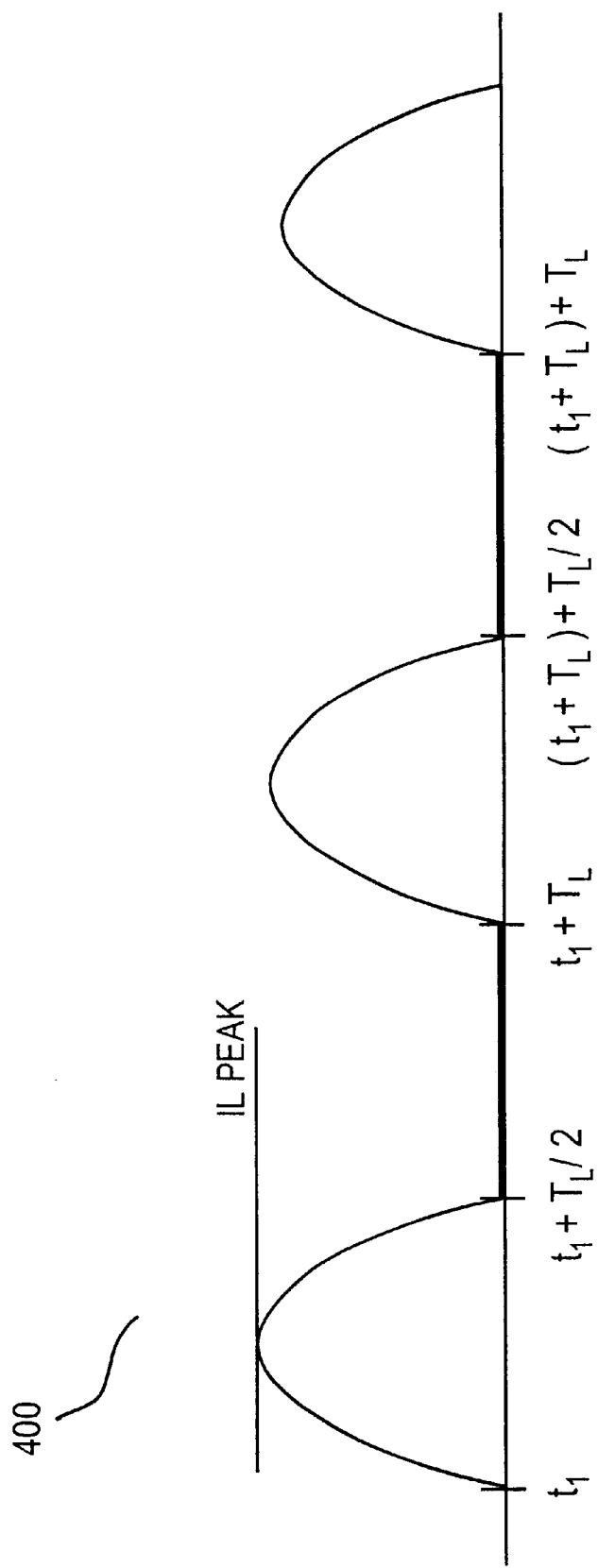
FIG. 9a is a signal diagram of the load current.

In soft start mode, the feedback signal, VIFB is a function of load current IL. IL is generally a sinusoidal waveform. Following Ohm's Law, VIFB is proportional to Rsense*IL. VIFB approximately equals 0.45*Rsense*ILrms and is derived as follows.

$$ILrms = \sqrt{\left[\int_{1}^{1+TL}(ILpeak*Sin(t))^2\ dt\right]/T_L} = ILpeak/\sqrt{2}$$

where $T_L$ is the period of the sinusoid, $t_1$ and $t+T_L$ respectively define the start and end points of one period of the sinusoid, and ILpeak is the peak load current. Diodes 137 filter out the negative portions of IL, thereby generating a waveform, IL(+), an example of which is illustrated by signal 400 in FIG. 9a, which depicts the half-rectified current waveform delivered to the load. With the phased burst signal, PWM 50, decoupled from circuit 200, VIFB is effectively the voltage across Rsense. That is, $$VIFB = \left[\int_{1}^{1+TL} Rsense*IL(+)dt\right]/T_L$$
$$= (ILpeak*Rsense)/\pi$$

Since ILrms=ILpeak/√2,

VIFB=(√2/π)*ILrms*Rsense≈0.45*ILrms*Rsense

The present invention is not to be limited by this method of determining feedback, VIFB. In the exemplary embodiment, in both soft start and burst modes, the constant reference voltage, ADJ, equals 0.45*ILrms(spec)*Rsense, where ILrms(spec) is generally a constant defined by the load's operational specifications as described above. Therefore, when the load 18 is at full power, i.e., on, as per operational specifications, VIFB will equal ADJ. Since the load 18 is turned on from an off state, at the initiation of soft start mode, IL is effectively zero. Consequently, VIFB is effectively zero, i.e. less than ADJ. Therefore, ICMP is high. As IL is increased by the soft start controller (not shown), VIFB increases, thereby reducing the difference between VIFB and ADJ. Consequently, ICMP decreases. When VIFB=ADJ, the load 18 is operationally on as described above, and ICMP carries the energy to regulate the load 18 at its operational current. Therefore, the warm up stage defined by the soft start mode concludes when the energy provided by the soft start controller (not shown) has increased to match that provided by ICMP. At this time, the soft start controller (not shown) ceases control, and ICMP regulates load current. Burst mode begins.

In burst mode, circuit 200 generates the controlling signal, ICMP, based on both the load current, IL, and PWM signal 50. Therefore, VIFB no longer adheres solely to the equation, VIFB=(0.45)*Rsense*ILrms. Instead, the above equation is supplemented by a factor determined by the presence of PWM signal 50. Consequently, in burst mode, ICMP follows the PWM signal 50 and drives the load 18. This is described further below.

Switch 134 couples circuit 200 to phase delay array 16 during burst mode. In an exemplary system, switch 134 is a PNP transistor 134 with a reference power source, REF, at its source (or emitter) and the respective phased burst mode signal (PWM) 50 at its gate (or base). The reference power of REF may be derived via a voltage divider circuit (not shown) dividing, for example, an exemplary IC source voltage, VCC (not shown). When triggered by PWM 50, switch 134 couples its drain (or collector) to the REF at its source, transmitting a signal, PWM_52, to circuit 200. In the preferred embodiment, the switch 134 is triggered by a low signal at its gate, and therefore, PWM_52 is complimentary to PWM 50. When PWM 50 is high, transistor 134 is off, and PWM_52 is isolated from PNP 134; that is, no burst mode information is transmitted to circuit 200, and VIFB follows the equation, 0.45*ILrms*Rsense, in an exemplary embodiment. When PWM 50 is low, transistor 134 is on, and PWM_52 is high. Rlimit 135 translates PWM_52 current into voltage. This voltage is added to VIFB. Rlimit is chosen such that the voltage added into VIFB effects ICMP to vary load current from an operationally on state to an off state. This is discussed further below.

The PWM signal 50 is introduced and PWM_52 generated as described above. When PWM 50 goes low, PWM_52 goes high, and therefore, VIFB exceeds ADJ. To decrease VIFB and match VIFB to ADJ, ICMP goes low. Since ICMP drives the load 18, the load 18 effectively turns off. One skilled in the art will recognize that the load 18 being off does not require current or voltage to the load 18 to be zero; current or voltage may continue to charge the load 18 minimally when it is off. Then, when PWM 50 goes high, PWM_52 is decoupled from the reference voltage, REF. VIFB returns to the equation VIFB=0.45*ILrms*Rsense in the exemplary embodiment. Since the load is effectively off, ILrms approximates zero. ICMP goes high to build VIFB to approximate ADJ. Consequently, load current, IL, goes high, and the load 18 turns on. The result, as seen from FIG. 10, is that load current, IL, follows the respective phased burst signal, PWM 50. However, that load current IL also lags the respective burst signal, PWM 50.

Figure 11:
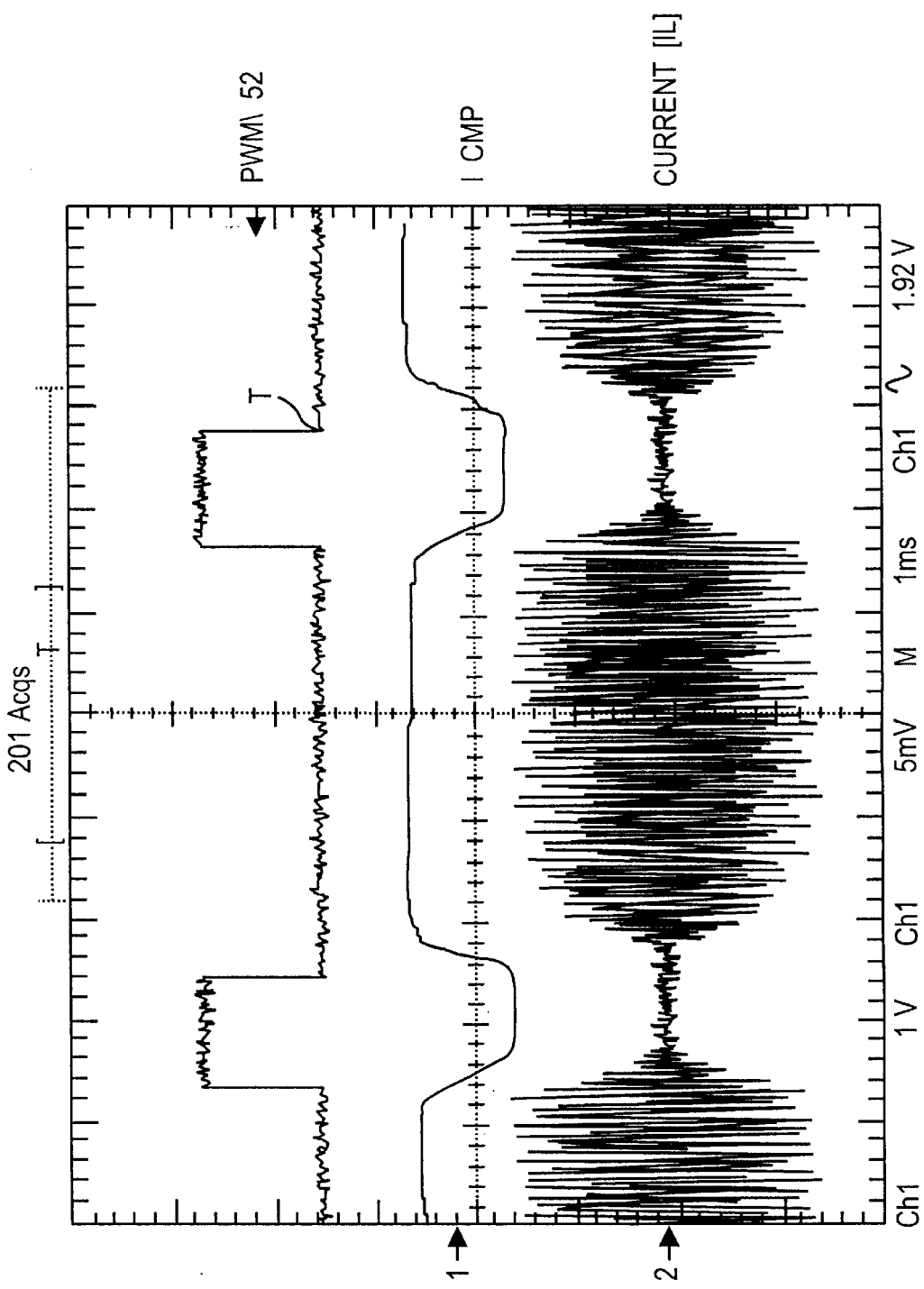
FIG. 11 is a power regulating signal generated by an exemplary phase array driver of the present invention.

FIG. 11 displays oscilloscope signal readouts of PWM_52, ICMP and load current IL during burst mode operation of an exemplary system of the present invention. PWM_52 is timed with the respective phased burst signal, PWM 50; that is, no significant delay exists between high-to-low or low-to-high transitions of PWM 50 and the respective low-to-high or high-to-low transitions of PWM_52. Because the error amplifier 120 has finite charge and discharge current, it takes time to charge or discharge CFB 139 when VIFB goes higher or lower than ADJ, respectively. Consequently, as seen in FIG. 11, ICMP lags PWM_52. Since ICMP drives the load 18 during burst mode operation, load current, IL, likewise lags PWM_52.

Figure 12:
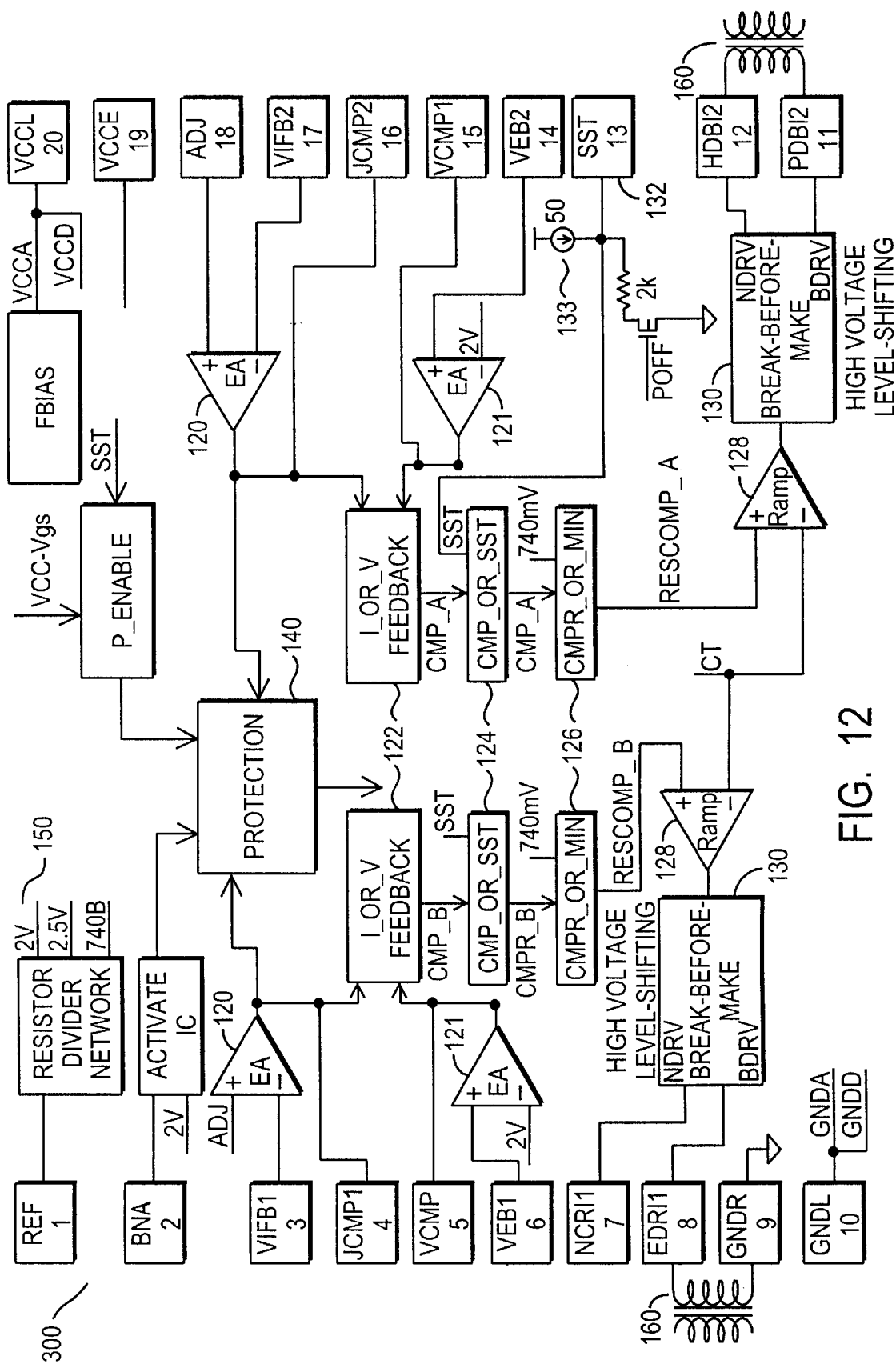
FIG. 12 is an exemplary IC implementation of a phase array driver IC in the present invention.

FIG. 12 provides an exemplary IC implementation 300 of a phase array driver 100. IC 300 comprises a break-before-make circuit 130 with a half-bridge switching topology. This is discussed further below. In alternative IC implementations, switching topologies such as "full bridge," "forward," or "push-pull," can be used without departing from the scope of the present invention. Continuing references to FIG. 9 are included to explain some operational aspects of IC 300. Exemplary IC 300 receives two phased burst signals (PWM signals) 50 which are 180 degrees out of phase with each other. Exemplary IC 300 utilizes these phased burst signals 50 to drive two respective loads whose signals are 180 degrees out of phase with each other. Thus, those skilled in the art will recognize duplication of certain components (e.g., selectors 122, 124 and 126) to drive two individual loads. Of course, IC 300 is only an example, and may be readily configured to drive three or more loads (or a single load). At the outset, description will be made to selectors 122, 124 and 126 which may be constructed from generic comparator circuitry and/or custom circuitry to accomplish the signal detection, as set forth below.

Exemplary IC 300 comprises an error amplifier 121 for voltage sensing, an error amplifier 120 for current sensing, a current or voltage feedback selector 122, a burst mode or soft start selector 124, and a minimum voltage selector 126. Selectors 122, 124, and 126 may be of the same structure, comprising 1 comparator and 2 transmission gates, and may be implemented with multiplexers.

As described above, each error amplifier 120 generates a current controlling signal, ICMP (shown at pin 4 in the exemplary IC 300) by comparing ADJ with feedback, VIFB (shown at pin 3 in the exemplary IC 300), determined by load current, IL, in soft start mode, and by both IL and phased burst signal, PWM 50, in burst mode.

Figure 13:
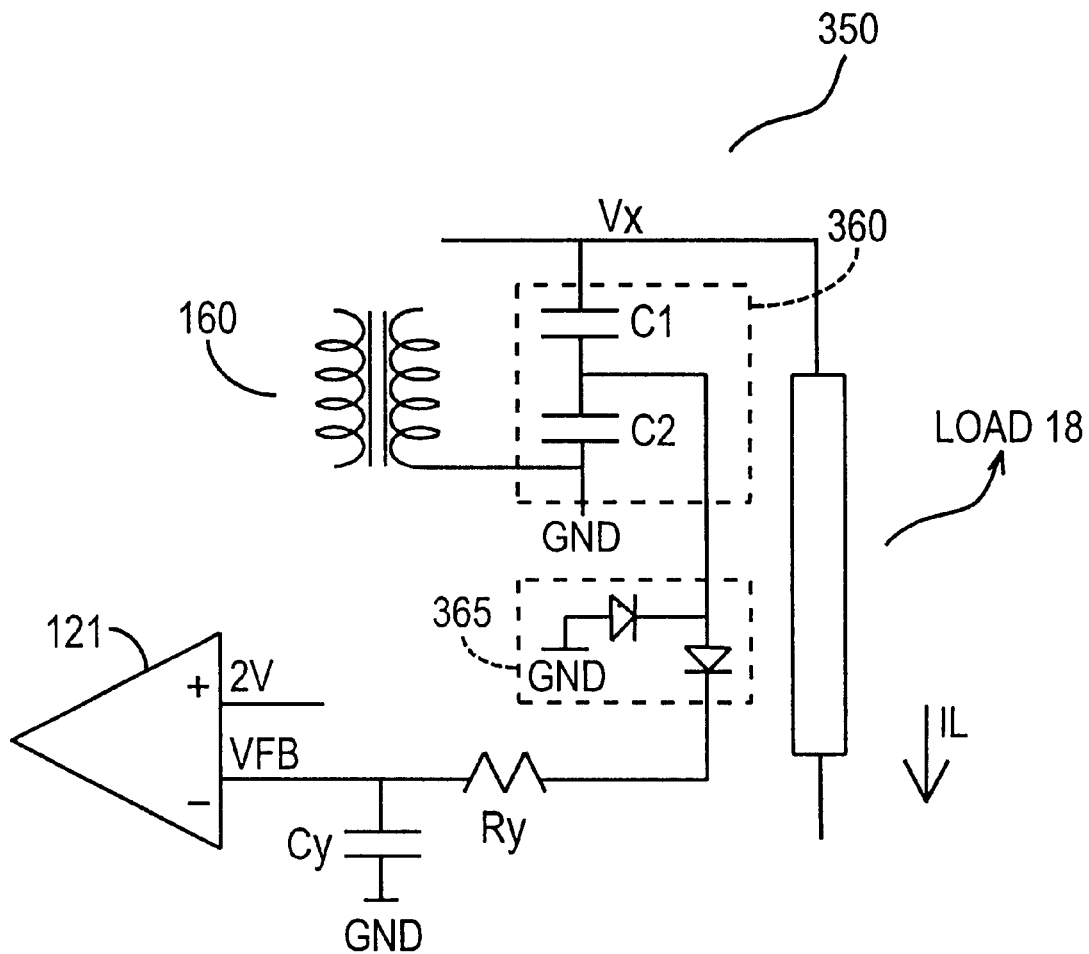
FIG. 13 is a circuit example showing how a phase array driver generates a voltage clamping signal in an exemplary IC of the present invention.

Likewise, FIG. 13 provides an exemplary circuit 350 showing an error amplifier 121 for generating a voltage controlling signal, VCMP (at pin 5 in the exemplary IC), by comparing a reference voltage (e.g., 2V) with a voltage feedback signal, VFB (at pin 6 in the exemplary IC 300) determined by load voltage. In an exemplary embodiment, when the load is initially powered on, power delivered to the load by the soft start controller (at input 132), heretofore referred to as SST, is low. That is, the load voltage, $V_X$, on the secondary side of transformer 160 is low. Consequently, VFB is low. Since the difference between VFB and the reference signal (e.g., 2V) is greater than the threshold of comparison, error amplifier 121 generates a high VCMP signal. The relationship between VFB and load voltage is discussed further below. As SST increases, VFB increases and approaches the reference voltage (e.g., 2V), and VCMP decreases. When VFB matches the reference voltage (e.g., 2V), VCMP is chosen instead of SST to drive load voltage, effectively clamping the load voltage at a predetermined value such that VFB matches the reference voltage (e.g., 2V). Circuitry 360 illustrates the relationship between VFB, and the actual load voltage, $V_X$, provided at the secondary side of the transformer, in the exemplary circuit 350:

$$VFB = V_X * C1/(C1+C2)$$

Therefore, C1 and C2 are chosen such that VFB, the voltage feedback signal, reflects a desired factor of load voltage, $V_X$. For example, if C2=1000*C1, then, VFB=$V_X$/1000, that is, VFB is a representation of load voltage which is $1/1000^{th}$ of load voltage, $V_X$. In this example, if the reference voltage is 2 Volts, then, the load voltage is clamped at 2000 Volts. Further, analogous to half-wave rectifier diodes 137 of FIG. 9, diodes 365 generate a half wave rectified voltage signal. Ry and Cy are peak voltage detectors to detect the peak voltage of the rectified waveform.

The current or voltage feedback selector 122 (I_or_V Feedback), selects either the voltage controlling signal, VCMP, or current controlling signal, ICMP, as the signal to drive the load during burst mode operation. In an exemplary IC 300, selector 122 chooses VCMP if load voltage exceeds the aforementioned predetermined value while load current is less than the operational current (i.e., VIFB<ADJ). Otherwise, selector 122 selects ICMP. Selector 122 may utilize alternative comparisons to determine the selection of a controlling signal, for example, selector 122 could be configured to compare ADJ and VIFB to determine if the load has reached operational or predetermined full power. The following discussion proceeds with reference to a controlling signal, CMP, which may either be ICMP or VCMP as described above.

In the exemplary IC 300, selector 122 is coupled to the burst mode or soft start selector 124 (CMP_OR_SST).

Selector 124 of the exemplary IC 300 determines which of the aforementioned two modes of operation apply, i.e., soft start or burst mode, and toggles from soft start to burst mode when appropriate, as follows. Selector 124 compares CMP and SST (the load power controlling energy generated by the soft start controller) to determine which mode applies and to generate a signal, CMPR, which is either the soft start signal, SST, in soft start mode, or the controlling signal, CMP, in burst mode. Since, as described above, burst mode is triggered once the load 18 has reached an operationally on state, CMPR is SST prior to SST equaling CMP, and CMPR is CMP once SST equals or exceeds CMP. The soft start controller which provides for the soft start signal (SST) is implemented, for example, by using a capacitor (not shown) externally coupled to pin 13, 132, whose charging rate determines the rate at which the load is powered up. In this example, SST voltage equals $I_s/(C*T)$ where $I_s$ is the current supplied by power source 133 and C is the capacitance of the external capacitor (not shown). The capacitance of the external capacitor (not shown) may be varied to vary the rate at which load current, IL, is increased during soft start mode. Although soft start mode ends and burst mode begins when CMP matches SST, and CMP regulates power to the load during burst mode, SST continues to increase to VCC.

Selector 124 is coupled to a minimum voltage selector, CMPR_or_MIN 126, in the exemplary IC 300. The output of selector is herein referred to as RESCOMP. Selector 126 ensures that a predetermined minimum power is delivered to the load, even when the load is in an "off" state. That is, when power delivered to the load is less than a predetermined minimum value, RESCOMP is a minimum voltage, for example, 740 mV. If the load voltage is above the predetermined minimum voltage, then RESCOMP is CMPR (i.e., either CMP or SST as described above).

Consequently, in burst mode, whenever PWM 50 goes low and the load turns off as described above, a predetermined minimum voltage is maintained across the load. The desirability of maintaining a minimum voltage across the load is explained below with reference to a CCFL (Cold Cathode Fluorescent Lamp) as an exemplary load.

A CCFL is of high impedance when off. Thus, a large voltage is needed to initially induce current through the lamp, that is, to turn on the lamp. In the exemplary IC 300, a large voltage is applied to the CCFL, by the secondary side of transformer 160, to turn on the lamp. Once current has been induced through the lamp, the impedance is decreased, and consequently, voltage may be decreased to operational levels. The predetermined minimum power is maintained across the load thereafter to avoid having to repeat the application of a large voltage to turn on the lamp.

When a predetermined minimum voltage is selected by selector 126, ramp 128 functions as a pulse width modulator (PWM) and generates a PWM signal with pulse width determinative of power to the load. The functionality of ramp 128 is analogous to that of pulse width modulator 12 discussed in relation to FIG. 3. With reference to this analogy, the DC voltage utilized by the ramp 128 for the generation of the PWM signal is the predetermined minimum voltage. The predetermined minimum voltage, in intersection with the triangular signal 34 discussed in relation with FIG. 3, generates a PWM pulse width that is minimally adequate to maintain a signal. Effectively, ramp 128 utilizes the predetermined minimum voltage supplied by selector 126, to leave the load minimally powered on when the load is off, during each burst cycle. Where the load voltage is in excess of the predetermined minimum, the power signal determined by aforementioned burst signal PWM 50 is utilized.

Break-before-make circuit 130 utilizes the appropriate signals described above to turn a transformer 160 on and off. Note that, alternatively, any suitable switch may be used for this purpose. The exemplary IC 300 includes two switches used in a half-bridge topology, i.e., as a general-purpose DC/AC converter, the outputs of the break-before-make circuit 130, NDRI and PDRI, turn on or off an NMOSFET and PMOSFET respectively, thereby switching a transformer 160 to ground or to VCC (power supply) respectively. Significantly, the break-before-make circuit ensures that the NMOSFET and PMOSFET each turn on exclusively as to the other. That is, the NMOSFET and PMOSFET generate a pair of non-overlapped signals. In an alternative embodiment, four switches are used in a full bridge (H-bridge) topology to switch the transformer 160 to ground or to VCC. The switches convert the DC rail voltage (VCC) to an AC signal which is supplied to the primary side of the transformer, as is well known to those skilled in the art.

Figure 14A:
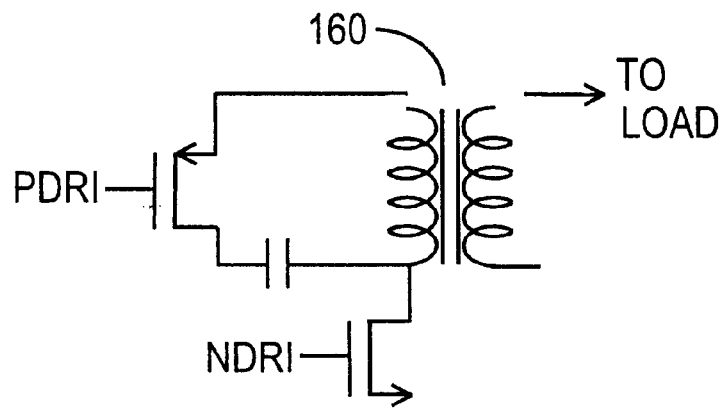
FIGS. 14(a) and 14(b) provide circuit examples of half-bridge and full-bridge (H-bridge) topologies respectively.
Figure 14B:
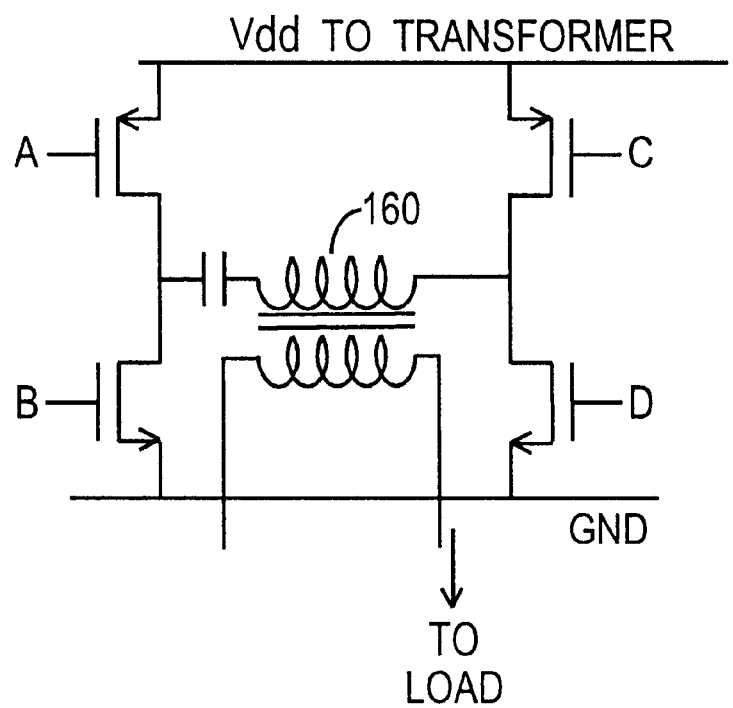

FIGS. 14(a) and 14(b) are circuit examples of conventional DC/AC converter topologies using half bridge and full bridge switching schemes, respectively. The half bridge topology exemplified by FIG. 14(a) is provided in the exemplary IC 300 and described above. An alternative embodiment utilizes a full bridge (H-bridge) topology exemplified by FIG. 14(b). The full bridge topology typically utilizes two NMOSFET and PMOSFET pairs generating two pairs of non-overlapped signals. This is described below with reference to FIG. 15. The transformer 160 is turned on or off by alternating the conduction of pairs of crossed switches, A and D (AD), and B and D (BD), respectively. The break-before-make circuit 130 ensures that AD and BC are not on at the same.

Figure 15:
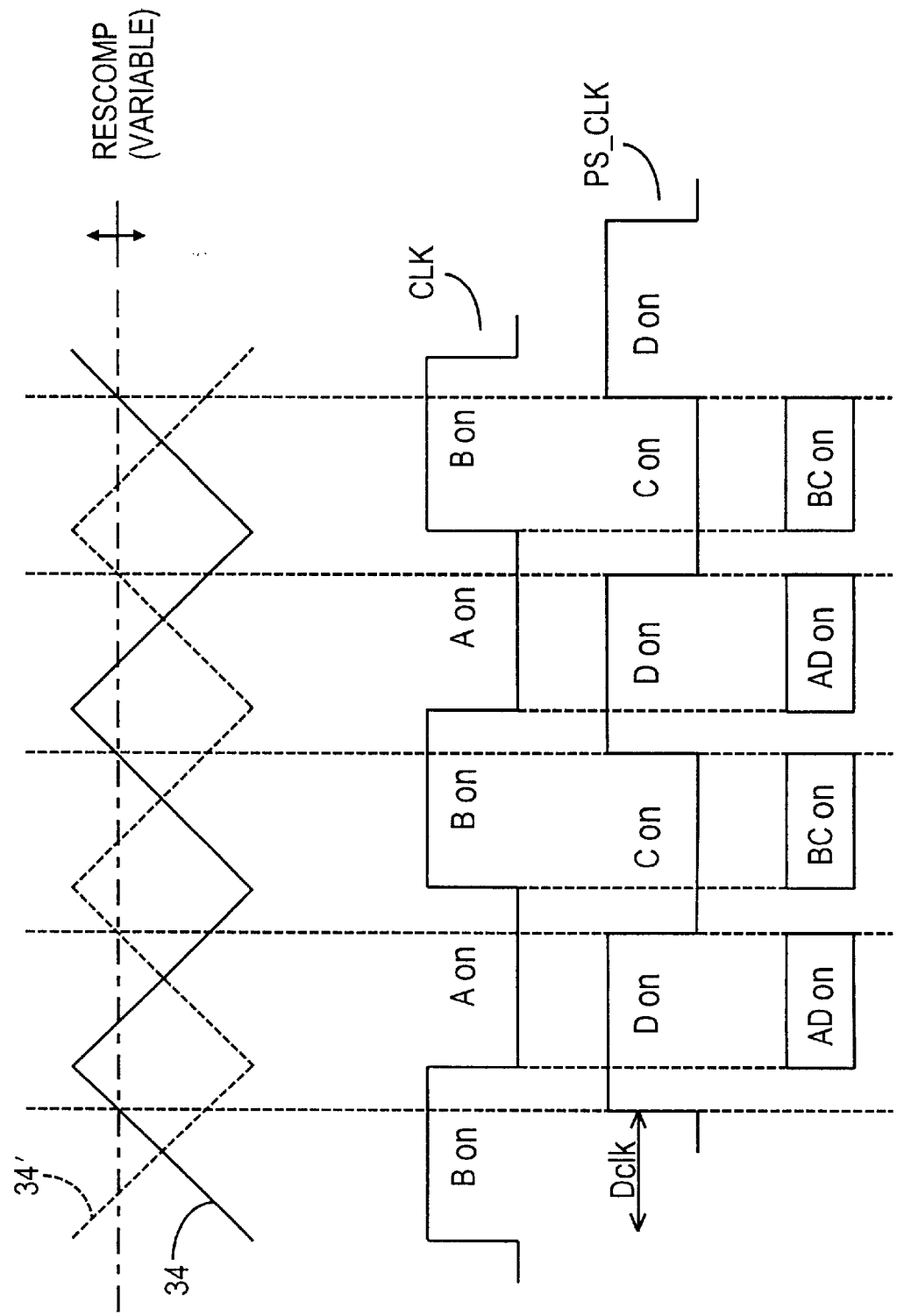
FIG. 15 provides a signal generation example showing the generation of cross switch signals in a full-bridge topology.

FIG. 15 provides a signal generation example showing the generation of crossed switch signals (i.e., AD and BC signals) in a full-bridge topology of an exemplary embodiment of the present invention. As discussed in reference to FIG. 3, oscillator 22 generates the triangular signal 34. Signal 34 is inverted to generate signal 34'. RESCOMP is the output of selector 126. That is, RESCOMP is one of ICMP, VCMP, SST, or MIN (e.g., 740 mV). Therefore, RESCOMP is variable. A reference signal, CLK, is utilized to independently toggle switches A and B. In an exemplary embodiment, CLK has a 50% duty cycle and follows signal 34. A second reference signal, PS_CLK, is utilized to independently toggle switches C and D. In the exemplary embodiment, PS_CLK is a CLK signal phased by an adjustable delay, $D_{clk}$. RESCOMP determines $D_{clk}$. This is discussed as follows. The positive and negative edge of each pulse of PS_CLK are generated by the respective intersection of the rise of signal 34 and RESCOMP and the respective intersection of rise of signal 34' and RESCOMP. Therefore, when RESCOMP increases, as, for example, when the respective phased burst signal 50 goes high during burst mode, the phase delay, $D_{clk}$, between CLK and PS_CLK increases. The on times of switching pairs, AD and BC, are determined by the overlaps of CLK and PS_CLK. Therefore, when $D_{clk}$ increases, the on times of AD and BC increase, thereby causing more power to be delivered to the respective load. Note, however, that the present invention is not limited by any particular driver architecture, and therefore, not limited to half-bridge or full-bridge topologies.

Returning to IC 300 of FIG. 12, in the exemplary embodiment, where voltage supplied to the transformer 160 exceeds the source voltage to the IC 300, the break-before-make circuit 130 utilizes "High Voltage Level Shifting". "High voltage level shifting" is explained by the following example. VCC is 5 volts. That is, PMOSFET gate control signal levels vary from ground (0 volts) to VCC (5 volts). If 15 volts are fed into the transformer 160, the break-before-make circuit 130 provides a DC voltage shift of 10 volts to the PDRI output, thereby allowing for the PMOSFET gate control signal to reach 15 volts (10 volts via DC high voltage level shifting +5 volts VCC).

Exemplary IC 300 further includes protection circuitry 140. In this IC 300, circuitry 140 is an under voltage lock out circuit (UVLO). At the end of soft start mode, if the voltage delivered to the transformer 160 does not decrease, or if load current, IL, does not reach the specified full operational level, circuitry 140 shuts down IC 300. Primarily, circuitry 140 senses load current and shuts down IC 300 during burst mode operation if VIFB is lower than ADJ while maximum power is being delivered to the load. Note that when VIFB is lower than ADJ, error amplifier 120 increases output power to the load as discussed above. Therefore, circuitry 140 shuts down the IC upon the above condition in order to prevent damage to components from excessive power delivery. Also, protection circuitry 140 is disabled during the soft start duration described above.

Thus, it is evident that there has been provided a sequential burst mode regulating circuit that satisfies the aims and objectives stated herein. Those skilled in the art will recognize numerous modifications that can be made to the present invention, and all such modifications are deemed within the spirit and scope of the present invention, only as may be limited by the appended claims.

What is claimed is:

1. A phased load regulation system comprising a phased delay array adapted to generate a plurality of phase-shifted burst mode signals, wherein each said phase shifted burst mode signal regulating power to a respective load.

2. A phased load regulation system as claimed in claim 1, further comprising a modulator generating a PWM signal, said phased delay array receiving said PWM signal and wherein power delivered to each respective load determined by the pulse width of said PWM signal.

3. A phased load regulation system as claimed in claim 1, further comprising a frequency selector receiving a reference signal and generating a frequency selection signal based on said reference signal, wherein said phased delay array receiving said frequency selection signal and setting the frequency of said phase-shifted burst mode signals based on said frequency selection signal.

4. A phased load regulation system as claimed in claim 2, wherein said modulator further comprising a variable selector for setting the pulse width of said PWM signal.

5. A phased load regulation system as claimed in claim 1, wherein each said load comprises a CCFL.

6. A phased load regulation system as claimed in claim 1, further comprising phase array driver circuits receiving said plurality of phase-shifted burst mode signals and generating at least one power regulating signal for each respective load.

7. A Phased load regulation system as claimed in claim 6, further comprising a half bridge inverter circuit receiving said at least one power regulating signals and generating an AC signal based thereon to power said load.

8. A phased load regulation system as claimed in claim 6, further comprising a full bridge inverter circuit receiving said at least one power regulating signals and generating an AC signal based thereon to power said load.

9. A computer system comprising an LCD panel, a plurality of cold cathode fluorescent lamps lighting said LCD panel, and a lamp driving system comprising a phased delay array adapted to generate a plurality of phase-shifted burst mode signals, wherein each said phase shifted burst mode signal regulating power to each of said plurality of said cold cathode fluorescent lamps.

10. A computer system as claimed in claims 9, further comprising a modulator generating a PWM signal, said phased delay array receiving said PWM signal and wherein power delivered to each respective cold cathode fluorescent lamp determined by the pulse width of said PWM signal.

11. A computer system as claimed in claim 9, further comprising a frequency selector receiving a reference signal and generating a frequency selection signal based on said reference signal, wherein said phased delay array receiving said frequency selection signal and setting the frequency of said phase-shifted burst mode signals based on said frequency selection signal.

12. A computer system as claimed in claim 10, wherein said modulator further comprising a variable selector for setting the pulse width of said PWM signal, thereby setting the brightness of each said cold cathode fluorescent lamp.

13. A computer system as claimed in claim 9, further comprising phase array driver circuits receiving said plurality of phase-shifted burst mode signals and generating at least one power regulating signal for each respective load.

14. A computer system as claimed in claim 13, further comprising a half bridge inverter circuit receiving said at least one power regulating signal and generating an AC signal based thereon to power said load.

15. A computer system as claimed in claim 13, further comprising a frill bridge inverter circuit receiving said at least one power regulating signal and generating an AC signal based thereon to power said load.

16. An LCD panel comprising a plurality of cold cathode fluorescent lamps lighting said LCD panel, and a lamp driving system comprising a phased delay array adapted to generate a plurality of phase-shifted burst mode signals, wherein each said phase shifted burst mode signal regulating power to each of said plurality of said cold cathode fluorescent lamps.

17. An LCD panel as claimed in claim 16, further comprising a modulator generating a PWM signal, said phased delay array receiving said PWM signal and wherein power delivered to each respective cold cathode fluorescent Lamp determined by the pulse width of said PWM signal.

18. An LCD panel as claimed in claim 16, further comprising a frequency selector receiving a reference signal and generating a frequency selection signal based on said reference signal, wherein said phased delay array receiving said frequency selection signal and setting the frequency of said phase-shifted burst mode signals based on said frequency selection signal.

19. An LCD panel as claimed in claim 17, wherein said modulator further comprising a variable selector for setting the pulse width of said PWM signal, thereby setting the brightness of each said cold cathode fluorescent lamp.

20. An LCD panel as claimed in claim 16, further comprising phase array driver circuits receiving said plurality of phase-shifted burst mode signals and generating at least one power regulating signal for each respective load.

21. An LCD panel as claimed in claim 20, further comprising a half bridge inverter circuit receiving at least one said power regulating signal and generating an AC signal based thereon to power said load.

22. An LCD panel as claimed in claim 20, further comprising a full bridge inverter circuit receiving said at least one power regulating signal and generating an AC signal based thereon to power said load.

* * * * *

UNITED STATES PATENT AND TRADEMARK OFFICE
CERTIFICATE OF CORRECTION

PATENT NO. : 6,707,264 B2
DATED : March 16, 2004
INVENTOR(S) : Lin et al.

It is certified that error appears in the above-identified patent and that said Letters Patent is hereby corrected as shown below:

<u>Title page,</u>
Item [73], Assignee, replace "2Micro International Limited" with
-- O2Micro International Limited --

Signed and Sealed this

Twenty-second Day of March, 2005

JON W. DUDAS
*Director of the United States Patent and Trademark Office*

(12) INTER PARTES REEXAMINATION CERTIFICATE (0186th)
United States Patent
Lin et al.

(10) Number: US 6,707,264 C1
(45) Certificate Issued: *Sep. 7, 2010

(54) SEQUENTIAL BURST MODE ACTIVATION CIRCUIT

(75) Inventors: Yung-Lin Lin, Palo Alto, CA (US); Yu-Cheng Chang, Foster City, CA (US); Bingwei Yao, Chofu (JP)

(73) Assignee: O2Micro International Limited, Georgetown, Grand Cayman (KY)

Reexamination Request:
No. 95/000,274, Jul. 11, 2007
No. 90/008,175, Aug. 18, 2006

Reexamination Certificate for:
Patent No.: 6,707,264
Issued: Mar. 16, 2004
Appl. No.: 10/299,206
Filed: Nov. 19, 2002

(*) Notice: This patent is subject to a terminal disclaimer.

Certificate of Correction issued Mar. 22, 2005.

Related U.S. Application Data

(63) Continuation of application No. 09/757,265, filed on Jan. 9, 2001, now Pat. No. 6,501,234.

(51) Int. Cl.
*H05B 37/02* (2006.01)

(52) U.S. Cl. .......... 315/307; 315/98; 315/209 R
(58) Field of Classification Search ............ None
See application file for complete search history.

(56) References Cited

U.S. PATENT DOCUMENTS

| | | | |
|---|---|---|---|
| 4,623,824 A | 11/1986 | Scolari et al. | |
| 4,629,946 A | 12/1986 | Amano et al. | |
| 4,763,239 A | 8/1988 | Ball | |
| 4,859,912 A | 8/1989 | Lippmann et al. | |
| 4,904,906 A | 2/1990 | Atherton et al. | |
| 4,907,862 A | 3/1990 | Suntola | |
| 5,239,293 A | 8/1993 | Barbier | |
| 5,337,068 A | 8/1994 | Stewart et al. | |
| 5,384,516 A | 1/1995 | Kawabata et al. | |
| 5,416,496 A | 5/1995 | Wood | |
| 5,615,093 A | 3/1997 | Nalbant | |
| 5,619,402 A | 4/1997 | Liu | |
| 5,731,794 A | 3/1998 | Miyazawa | |
| 5,742,134 A | 4/1998 | Wacyk et al. | |
| 5,818,669 A | 10/1998 | Mader | |

(Continued)

FOREIGN PATENT DOCUMENTS

| | | |
|---|---|---|
| EP | 0298934 A1 | 1/1989 |
| EP | 0920052 A1 | 6/1999 |
| JP | 05-113604 A | 5/1993 |
| JP | H07-159755 A | 6/1995 |
| JP | H11-3039 A | 1/1999 |
| JP | H11-202285 A | 7/1999 |
| WO | WO 93/13514 A1 | 7/1993 |

OTHER PUBLICATIONS

Stan Gibilisco "The Illustrated Dictionary of Electronics", eighth edition, 2001 McGraw–Hill, pp. 40, 90, 91, 126, 301, 452, 525 and 563.*

(Continued)

*Primary Examiner*—Margaret Rubin

(57) ABSTRACT

A sequential burst mode regulation system to deliver power to a plurality of loads. In the exemplary embodiments, the system of the present invention generates a plurality of phased pulse width modulated signals from a single pulse width modulated signal, where each of the phased signals regulates power to a respective load. Exemplary circuitry includes a PWM signal generator, and a phase delay array that receives a PWM signal and generates a plurality of phased PWM signals which are used to regulate power to respective loads. A frequency selector circuit can be provided that sets the frequency of the PWM signal using a fixed or variable frequency reference signal.

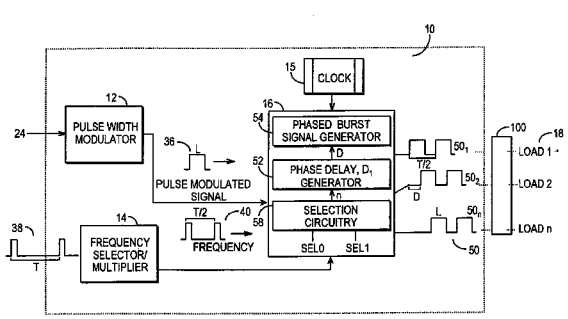
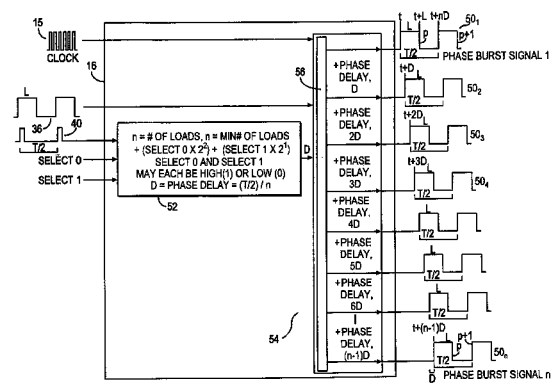

U.S. PATENT DOCUMENTS

| | | | | |
|---|---|---|---|---|
| 5,844,540 | A | * 12/1998 | Terasaki | 345/102 |
| 5,923,129 | A | 7/1999 | Henry | |
| 5,926,239 | A | 7/1999 | Kumar et al. | |
| 5,930,121 | A | 7/1999 | Henry | |
| 5,965,989 | A | 10/1999 | Mader | |
| 6,008,590 | A | 12/1999 | Giannopoulos et al. | |
| 6,114,814 | A | * 9/2000 | Shannon et al. | 315/219 |
| 6,198,236 | B1 | 3/2001 | O'Neill | |
| 6,249,328 | B1 | 6/2001 | Fukuzawa et al. | |
| 6,313,976 | B1 | 11/2001 | Balakrishnan et al. | |
| 6,316,881 | B1 | * 11/2001 | Shannon et al. | 315/219 |
| 6,448,951 | B1 | 9/2002 | Sakaguchi et al. | |
| 6,469,454 | B1 | 10/2002 | Mader et al. | |
| 6,567,866 | B1 | 5/2003 | Poisner | |
| 7,212,418 | B1 | * 5/2007 | Hsu et al. | 363/53 |
| 7,248,488 | B2 | * 7/2007 | Toda et al. | 363/26 |

OTHER PUBLICATIONS

Paul Horowitz et al "the art of Electronics" Cambridge University Press, copyright 1980.*
Google Definitions printout http://www.google.com/search?hl=en&q=define%3Aburst+mode&btnG=Search Apr. 25, 2008.*
"The improved burst mode in the stand–by operation of power supply" Choi et al IEEE 2004.*
"A Novel Dimming Technique for Cold Cathode Fluorescent Lamp" Hwu et al National Taipei University of Technology, Taiwan, published on or after 2005.*
"Resonant Fluorescent Lamp Converter provides efficient and Compact Solution" Jordan et al Unitrode Integrated Circuits, 1999.*
MP1010 Application Note 1 Jan. 2000 "MP1010 Resonant Mode CCFL Inverter" Monolithic Power Systems Inc. 23 Pgs.
MP1010 Application Note "MP1010 Resonant Mode CCFL Inverter" Monolithic Systems Inc. 23 Pgs, Paul Veunten, earliest date mentioned Mar. 29, 2000.
MP1010 Application Note "MP1010 Resonant Mode CCFL Inverter" Monolithic Power Systems Inc. 24 Pgs, Paul Veunten, earliest date mentioned Jan. 2000.
MP1010 Monolithic Power Systems, Inc. "Cold Cathode Fluorescent Lamp Driver" Aug. 2000 Rev 1.3 total 5 pgs.
MP1010 Monolithic Power Systems, Inc. "Cold Cathode Fluorescent Lamp Driver" Preliminary Data Sheet V.2 Feb. 1999 6pgs.
MP1010 Monolithic Power Systems, Inc. "Cold Cathode Fluorescent Lamp Driver" Version 1.0 Jul 1999 5pgs.
MP1010 Monolithic Power Systems, Inc. "Cold Cathode Fluorescent Lamp Driver" Version 1.2 Oct. 1999 5pgs.
MP1010 Monolithic Power Systems, Inc. "Cold Cathode Fluorescent Lamp Driver" Version 1.1 Sep. 1999 5pgs.
MP1011, Monolithic Power Systems, Inc. "Cold Cathode Fluorescent Lamp Driver" Preliminary Data Sheet Oct. 1999 5pgs.
Nalbant, "A New CCFL Inverter Circuit for AMLCD Panels Results in Significantly Higher Efficiency and Brightness" 4 pgs.
Rohn MU010–MPS–ITC004034 13 pgs, Jan. 20, 1997.
UCC1972/3, UCC2972/3 UCC3972/3 Unitrode "BiCMOS Cold Cathode Fluorescent Lamp Driver Controller" Jan. 2000 17 pgs.
UCC1972/3, UCC2972/3, UCC3972/3 Unitrode "BiCMOS Cold Cathode Fluorescent Lamp Driver Controller" Oct. 1998 revised Nov. 2000 17 pgs.
UCC2975, UCC2976, UCC2977, UCC3975, UCC3976, UCC3977 Texas Instruments "Multi–Topology Piezoelectric Transformer Controller" Jan. 2002 30 pgs.
OZ960A "High–Efficiency Inverter Controller" 9pgs.
Jim Williams, A Fourth Generation of LCD Backlight Technology, Linear Technology, Nov. 1995, Application Note 65.
Linear Technology, High Efficiency Switching Regulators.
O2 Micro, OZ962, High–Effieciency Inverter Controller, p. 1–10.
Society for Infomration Display, International Symposium, Digest of Technical Papers vol. XXIX, Anaheim Convention Center Anaheim, CA. May 17–22, 1998 Coles, Late–News Paper–7pgs.
Charles Coles, Application Engineer, Micro Linear Corporation "Single Stage CCFL Backlight Resonant Inverter Using PWM Dimming Method" 4 pgs, 1998.
EDN Web Printout–Integrated Circuits: Mar. 1, 1996 4 pgs.
Horowitz & Hill, Art of Electronics second Edition 4 pgs, 1989.
LT1070 Design Manual, Application Notes 19, Jun. 1986, Carl Nelson 80pgs.
LT1072 Linear Technology "1.25 High Efficiency Switching Regulator" 16 pgs.
LX1580/LX1581 "Fluorescent Backlight Controller IC" LinFinity Microelectronics Preliminary Specification 18 pgs.
MAXI1739–1839 Maxim Wide Brightness Range CCFL Backlight Controls 19–1755; Rev 1; 3/01 26 pgs.
ML4878 & Assoc. Docs Oct. 1998 Micro Linear "Single Stage LCD Backlight Lamp Driver" 40 pgs.
ML4878 Feb. 1997 Micro Linear "ML4878 LCD Backlight Lamp Driver" 14 pgs.
ML4878 Oct. 1998 Micro Linear "Single Stage LCD Backlight Lamp Driver" 17 pgs.
ML Application Note 68, May 1998 "ML4878 Single–Stage CCFL Backlight Resonant Inverter" 12 pgs.
ML1010 AN–01, May 1999 "Designing CCFL Inverters with the MP1010" 7 pgs.
ML1010 AN–01, May 1999 "Designing CCFL Inverters with the MP1010" 6 pgs Version.11.
Henry, Linfinity Application Note AN–13: LX1686 Direct Drive CCFL Inverter Design Reference, Rev. 1.0 (Sep. 1999) ("AN–13").
Lin, Resonant Inverters and Their Applications to Electronic Ballasts and High Voltage Power Conversions (UMI Dissertation Svcs., 1996) ("Lin Disserration").
Monolithic Power Systems, MP1010 Cold Cathode Fluorescent Lamp Driver Preliminary Data Sheet V.2 Feb. 1999 (1999) ("MP1010").
Wood, "HEXFETs Improve Efficiency, Expand Life of Electronic Lighting Ballasts," International Rectifier Application Note 973 (1996 or earlier) ("HEXFETs").
Yana et al., "An intelligent inverter for a high–power LCD backlight," Journal of the Society for Information Display, vol. 7, No. 3, pp. 163–166 (1999) ("Yana et al.").

* cited by examiner

US 6,707,264 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6, 13 and 20 are cancelled.

Claims 1-5, 7-12, 14-19, 21 and 22 are determined to be patentable as amended.

1. A phased load regulation system comprising a [phased] *phase* delay array [adapted to generate] *for receiving a frequency selection signal and generating* a plurality of phase-shifted burst mode *pulse width modulated* signals *having a frequency determined by said frequency selection signal*, wherein each said [phase shifted] *phase-shifted* burst mode *pulse width modulated* signal regulating power to a respective load *of a plurality of loads;*
    a modulator coupled to said phase delay array and for adjusting a pulse width of said phase-shifted burst mode pulse width modulated signals; and
    a plurality of phase array drivers coupled to said phase delay array and for receiving said phase-shifted burst mode pulse width modulated signals and generating a plurality of AC power regulating signals to regulate power to said plurality of loads respectively based on said pulse width of said phase-shifted burst mode pulse width modulated signals,
    wherein at least one of said AC power regulating signals has a phase value equal to a phase value of a corresponding phase-shifted burst mode pulse width modulated signal, and wherein at least one of said phase array drivers comprises a ramp circuit for delivering power to a corresponding load.

2. A phased load regulation system as claimed in claim 1, [further comprising a modulator generating a PWM signal, said phased delay array receiving said PWM signal and wherein power delivered to each respective load determined by the pulse width of said PWM signal] *wherein said phase delay array receives a pulse width modulated signal from said modulator, and wherein said pulse width of said phase-shifted burst mode pulse width modulated signals is determined by a pulse width of said pulse width modulated signal from said modulator*.

3. A phased load regulation system as claimed in claim 1, further comprising*:* a frequency selector receiving a reference signal and generating [a] *said* frequency selection signal based on said reference signal[, wherein said phased delay array receiving said frequency selection signal and setting the frequency of said phase-shifted burst mode signals based on said frequency selection signal].

4. A phased load regulation system as claimed in claim 2, wherein said modulator further [comprising] *comprises* a variable selector for setting [the] *said* pulse width of said [PWM] *pulse width modulated* signal *from said modulator*.

5. A phased load regulation system as claimed in claim 1, wherein each *of* said [load] *loads* comprises a [CCFL] *cold cathode fluorescent lamp*.

7. A [Phased] *phased* load regulation system as claimed in claim [6] *1*, [further comprising] *wherein at least one of said phase array drivers comprises* a half bridge inverter circuit [receiving said at least one power regulating signals and] *for* generating [an] *a corresponding* AC *power regulating* signal [based thereon to power said load] *for a respective load*.

8. A phased load regulation system as claimed in claim [6] *1*, [further comprising] *wherein at least one of said phase array drivers comprises* a full bridge inverter circuit [receiving said at least one power regulating signals and] *for* generating [an] *a corresponding* AC *power regulating* signal [based thereon to power said load] *for a respective load*.

9. A computer system comprising an LCD panel[,]*;* a plurality of cold cathode fluorescent lamps lighting said LCD panel[,]*;* and a lamp driving system comprising a [phased] *phase* delay array [adapted to generate] *for receiving a frequency selection signal and generating* a plurality of phase-shifted burst mode *pulse width modulated* signals *having a frequency determined by said frequency selection signal*, wherein each said [phase shifted] *phase-shifted* burst mode *pulse width modulated* signal regulating power to each of said plurality of said cold cathode fluorescent lamps*;*
    a modulator coupled to said phase delay array and for adjusting a pulse width of said phase-shifted burst mode pulse width modulated signals; and
    a plurality of phase array drivers coupled to said phase delay array and for receiving said phase-shifted burst mode pulse width modulated signals and generating a plurality of AC power regulating signals to regulate power to said plurality of cold cathode fluorescent lamps respectively based on said pulse width of said phase-shifted burst mode pulse width modulated signals,
    wherein at least one of said AC power regulating signals has a phase value equal to a phase value of a corresponding phase-shifted burst mode pulse width modulated signal, and wherein at least one of said phase array drivers comprises a ramp circuit for delivering power to a corresponding cold cathode fluorescent lamp.

10. A computer system as claimed in claims 9, [further comprising a modulator generating a PWM signal, said phased delay array receiving said PWM signal and wherein power delivered to each respective cold cathode fluorescent lamp determined by the pulse width of said PWM signal] *wherein said phase delay array receives a pulse width modulated signal from said modulator, and wherein said pulse width of said phase-shifted burst mode pulse width modulated signals is determined by a pulse width of said pulse width modulated signal from said modulator*.

11. A computer system as claimed in claim 9, further comprising*:* a frequency selector receiving a reference signal and generating [a] *said* frequency selection signal based on said reference signal[, wherein said phased delay array receiving said frequency selection signal and setting the frequency of said phase-shifted burst mode signals based on said frequency selection signal].

12. A computer system as claimed in claim 10, wherein said modulator further [comprising] *comprises* a variable selector for setting [the] *said* pulse width of said [PWM] *pulse width modulated* signal *from said modulator*, thereby setting [the] brightness of each *of* said cold cathode fluorescent [lamp] *lamps*.

14. A computer system as claimed in claim [13] *9*, [further comprising] *wherein at least one of said phase array drivers comprises* a half bridge inverter circuit [receiving said at least one power regulating signal and] *for* generating [an] *a*

*corresponding* AC *power regulating* signal [based thereon to power said load] *for a respective cold cathode fluorescent lamp.*

15. A computer system as claimed in claim [13] *9,* [further comprising] *wherein at least one of said phase array drivers comprises* a [frill] *full* bridge inverter circuit [receiving said at least one power regulating signal and] *for* generating [an] *a corresponding* AC *power regulating* signal [based thereon to power said load] *for a respective cold cathode fluorescent lamp.*

16. An LCD panel comprising a plurality of cold cathode fluorescent lamps lighting said LCD panel[,]*;* and a lamp driving system comprising a [phased] *phase* delay array [adapted to generate] *for receiving a frequency selection signal and generating* a plurality of phase-shifted burst mode *pulse width modulated* signals *having a frequency determined by said frequency selection signal*, wherein each said [phase shifted] *phase-shifted* burst mode *pulse width modulated* signal regulating power to each of said plurality of said cold cathode fluorescent lamps*;*
   *a modulator coupled to said phase delay array and for adjusting a pulsed width of said phase-shifted burst mode pulse width modulated signals; and*
   *a plurality of phase array drivers coupled to said phase delay array and for receiving said phase-shifted burst mode pulse width modulated signals and generating a plurality of AC power regulating signals to regulate power to said plurality of cold cathode fluorescent lamps respectively based on said pulse width of said phase-shifted burst mode pulse width modulated signals,*
   *wherein at least one of said AC power regulating signals has a phase value equal to a phase value of a corresponding phase-shifted burst mode pulse width modulated signal, and wherein at least one of said phase array drivers comprises a ramp circuit for delivering power to a corresponding cold cathode fluorescent lamp.*

17. An LCD panels as claimed in claim 16, [further comprising a modulator generating a PWM signal, said phased delay array receiving said PWM signal and wherein power delivered to each respective cold cathode fluorescent Lamp determined by the pulse width of said PWM signal] *wherein said phase delay array receives a pulse width modulated signal from said modulator, and wherein said pulse width of said phase-shifted burst mode pulse width modulated signals is determined by a pulse width of said pulse width modulated signal from said modulator.*

18. An LCD panel as claimed in claim 16, further comprising*:* a frequency selector *for* receiving a reference signal and generating [a] *said* frequency selection signal based on said reference signal[, wherein said phased delay array receiving said frequency selection signal and setting the frequency of said phase-shifted burst mode signals based on said frequency selection signal]*.*

19. An LCD panel as claimed in claim 17, wherein said modulator further [comprising] *comprises* a variable selector for setting [the] *said* pulsed width of said [PWM] *pulse width modulated* signal *from said modulator*, thereby setting [the] brightness of each *of* said cold cathode fluorescent [lamp] *lamps*.

21. An LCD panel as claimed in claim [20] *16,* [further comprising] *wherein at least one of said phase array drivers comprises* a half bridge inverter circuit [receiving at least one said power regulating signal and] *for* generating [an] *a corresponding* AC *power regulating* signal [based thereon to power said load] *for a respective cold cathode fluorescent lamp.*

22. An LCD panel as claimed in claim [20] *16,* [further comprising] *wherein each of said phase array drivers comprises* a full bridge inverter circuit [receiving said at least one power regulating signal and] *for* generating [an] *a corresponding* AC *power regulating* signal [based thereon to power said load] *for a respective cold cathode fluorescent lamp.*

\* \* \* \* \*